United States Patent
Marshall et al.

(10) Patent No.: US 8,804,551 B2
(45) Date of Patent: Aug. 12, 2014

(54) LOCATION ESTIMATION BY OBSERVING WIRELESS SIGNALS

(75) Inventors: Christopher Marshall, Haywards Heath (GB); Andrew Thomas Yale, East Grinstead (GB)

(73) Assignee: U-Blox AG, Thalwil (CH)

( * ) Notice: Subject to any disclaimer, the term of this patent is extended or adjusted under 35 U.S.C. 154(b) by 138 days.

(21) Appl. No.: 13/020,736

(22) Filed: Feb. 3, 2011

(65) Prior Publication Data

US 2011/0182238 A1    Jul. 28, 2011

Related U.S. Application Data

(63) Continuation-in-part of application No. 13/057,273, filed as application No. PCT/GB2009/050977 on Aug. 5, 2009.

(30) Foreign Application Priority Data

Aug. 6, 2008  (GB) .................................. 0814355.4
Dec. 21, 2010  (EP) .................................. 10196316

(51) Int. Cl.
  *H04L 12/26* (2006.01)
  *H04L 12/28* (2006.01)
  *H04W 4/00* (2009.01)
  *H04W 24/00* (2009.01)

(52) U.S. Cl.
  USPC ......... 370/252; 370/254; 370/328; 455/456.6

(58) Field of Classification Search
  None
  See application file for complete search history.

(56) References Cited

U.S. PATENT DOCUMENTS

| | | | |
|---|---|---|---|
| 7,221,928 B2 | 5/2007 | Laird et al. | |
| 7,397,424 B2 | 7/2008 | Houri | |
| 2004/0078140 A1 | 4/2004 | Rowitch et al. | |
| 2004/0176108 A1* | 9/2004 | Misikangas | 455/456.5 |
| 2005/0031047 A1 | 2/2005 | Maltsev et al. | |
| 2006/0019679 A1* | 1/2006 | Rappaport et al. | 455/456.5 |
| 2006/0217131 A1 | 9/2006 | Alizadeh-Shabdiz et al. | |

(Continued)

FOREIGN PATENT DOCUMENTS

WO          2005015255 A1    2/2005
WO   WO 2006/110181 A2   10/2006

(Continued)

OTHER PUBLICATIONS

Schilit, Bill N., et al., Challenge: Ubiquitous Location—Aware Computing and the "Place Lab" Initiative, ACM, New York, NY, Sep. 19, 2003, pp. 29-35.

Communication of Extended European Search Report dated Nov. 30, 2012, in European Patent Appl. No. 12171511.4.

(Continued)

*Primary Examiner* — Ashley Shivers
(74) *Attorney, Agent, or Firm* — Vierra Magen Marcus LLP

(57) ABSTRACT

A method and apparatus for estimating the position of an electronic device. The method comprises receiving an observation comprising the identity of at least one wireless transmitter detected by the device at the position to be estimate, comparing the observation with the contents of a set of record, detecting respective first and second matches between the observation and records, and retrieving the corresponding positions. The method comprises estimating the position of the electronic device based on at least one of the first position estimate and the second position estimate, depending upon quality characteristics of the first match and the second match and indications of the sources of the respective records.

17 Claims, 7 Drawing Sheets

(56) References Cited

U.S. PATENT DOCUMENTS

| | | |
|---|---|---|
| 2006/0271517 A1 | 11/2006 | Deloach, Jr. |
| 2007/0049295 A1 | 3/2007 | Soliman et al. |
| 2007/0073937 A1 | 3/2007 | Feinberg et al. |
| 2007/0081496 A1 | 4/2007 | Karge et al. |
| 2007/0182629 A1 | 8/2007 | Angus |
| 2007/0182637 A1 | 8/2007 | Karanik et al. |
| 2008/0218401 A1 | 9/2008 | Loomis et al. |
| 2008/0274750 A1* | 11/2008 | Carlson et al. ............. 455/456.1 |
| 2011/0143772 A1* | 6/2011 | Sridhara et al. ............ 455/456.1 |

FOREIGN PATENT DOCUMENTS

| | | |
|---|---|---|
| WO | WO2006110181 A2 | 10/2006 |
| WO | WO 2007/056738 A2 | 5/2007 |
| WO | WO 2007/076152 A2 | 7/2007 |
| WO | WO2008006077 A2 | 1/2008 |
| WO | 2009000842 A1 | 12/2008 |
| WO | WO 2009/141642 A1 | 11/2009 |
| WO | WO 2009/141660 A1 | 11/2009 |
| WO | WO 2010/141934 A1 | 12/2010 |

OTHER PUBLICATIONS

Communication pursuant to Article 94(3) EPC dated Feb. 27, 2012, in European Patent Appl. No. 09785447.5.
Summons to attend oral proceedings pursuant to Rule 115(1) EPC dated Oct. 23, 2012, in European Patent Appl. No. 09785447.5.
Amendment dated Dec. 19, 2012, in European Patent Appl. No. 10196316.3.
Weyn et al, "A WiFi Assisted GPS Positioning Concept", University College of Antwerp, Department of Applied Engineering, Jan. 31, 2008.
Office Action dated Oct. 8, 2012, in Chinese Patent Appl. No. 200980130534.3.
Amendment dated Feb. 20, 2013, in Chinese Patent Appl. No. 200980130534.3.
Office Action dated Jun. 25, 2013, in Chinese Patent Appl. No. 200980130534.3.
Office Action dated Dec. 17, 2013, in Japanese Patent Appl. No. 2011-521644.
Amendment dated Aug. 15, 2013, in Chinese Patent Appl. No. 200980130534.3.

* cited by examiner

LOCATION ESTIMATION BY OBSERVING WIRELESS SIGNALS

CROSS-REFERENCE TO RELATED APPLICATIONS

This is a non-provisional continuation-in-part application claiming the benefit of International Application Number PCT/GB2009/050977, filed Aug. 5, 2009,and U.S. patent application Ser. No. 13/057,273, filed Feb. 2, 2011.

BACKGROUND

This invention relates to a method and apparatus for estimating the location of an electronic device based on observations of wireless signals detectable by the device in its vicinity, and the identity of the transmitter(s) of those signals.

It has previously been proposed to provide a location beacon database to function as a positioning system. If the beacons are WiFi (WLAN) access points (APs), such a database contains their MAC addresses, known or estimated positions of the APs, and possibly their power profiles—that is, what signal strength can be expected at various locations around the AP. The database is usually populated by carrying out so-called "war-drives", gathering at known locations the identities of APs sighted and measurements of the AP signal strengths, and possibly other signal data (e.g. Doppler, error rate). The locations at which the APs are detected may be determined by a Global Positioning System (GPS) receiver.

Because of the burden of carrying out a "war-drive" exhaustively traversing an area of interest, it is usual for the responsibility for building the database to be shared among contributors, who are typically private individual hobbyists. In these circumstances, there is a heavy bias in the data sample towards the routes and locations most often frequented. This so called "arterial bias", introduces systematic inaccuracies into the deduced AP locations.

The database is used when a user requires a position fix. The process of finding a fix is typically as follows, according to the prior art:
(i) scan for observable APs, with their signal strengths and other signal data;
(ii) look up reference data about the location and possibly power profile of these APs in the database; and
(iii) derive the estimated user position.

However, this approach requires a large amount of data analysis. Sufficient sample data must be gathered to enable the location of each AP to be estimated or inferred, before it can be used to assist in determining location. Consequently, small sets of data relating to the detection of AP signals cannot reliably be used.

SUMMARY

According to an aspect of the present invention, there is provided a method of estimating the position of an electronic device, comprising:
receiving an observation comprising the identity of at least one wireless transmitter detected by the device at the position to be estimated;
comparing the observation with a plurality of records, each record comprising the identity of one or more wireless transmitters and a corresponding position, the position being based on a location or set of locations at which the one or more transmitters were detected;
detecting a first match between the observation and a first record, the first record comprising a corresponding first position;
establishing a first indication about the source of the first record;
detecting a second match between the observation and a second record, the second record comprising a corresponding second position;
establishing a second indication about the source of the second record, wherein the second indication is different from the first indication; and
estimating the position of the electronic device based on at least one of the first and second positions, depending upon the first indication and the second indication.

The present inventors have recognised that is advantageous to intelligently combine observations that have been made by different devices. In particular, it is advantageous to combine records in a manner that takes account of the source of each record. This approach is beneficial, for example, in the case described above, where a shared database is generated from the observations of several contributors. In such a scenario, it may be preferable to use a record that has been generated by the electronic device itself to establish a position, in preference to a record contributed by another device. This is because records generated by the same device are likely to be more relevant to the current observation than those generated by other devices. Records that have been generated by the same or similar devices they are likely to exhibit consistency. This may include consistency in geographic usage pattern (that is, the positions visited by the similar devices) or consistency in the manner in which the records were created (for example, devices using antennas with identical gain patterns and/or used in the same characteristic orientation). The present invention exploits this consistency, in order to improve the accuracy of the position estimation.

Optionally, the method further comprises determining a quality characteristic of the first match and a quality characteristic of the second match, wherein the step of estimating the position of the electronic device depends upon the first indication, the quality characteristic of the first match, the second indication and the quality characteristic of the second match According to embodiments, the method considers the quality of each match jointly with the indications of the origin of the respective matched record. In other words, the estimated position will depend both upon how good each match is and upon the properties of the device (or devices) that contributed to the record. The present inventors have recognised that when multiple (matched) records are available for use in estimating position, the attributes of the device and the internal context in which it created the record should be taken into account, preferably together with the quality of the match.

The source of a record may be indicated by a property, configuration, or state of the contributing device when it created the record. Important aspects of internal context and properties can be captured by studying intrinsic attributes of a contributor (for example, attributes of the device, user, or software responsible). The method enables the available information to be exploited to the greatest possible extent. The quality of the match can imply a certain level of confidence in the resulting position estimate. Likewise, the source of the data in the record can imply a certain level of trust that the data is an appropriate or relevant starting point from which to estimate the position of the electronic device. The method can combine both types of information, which can enable it to produce more accurate position estimates—particularly in the case where information of the two different types is in conflict.

In this context, "conflict" between the two different types of information arises when one type suggests one course of action and the other type suggests another. For example, if only the source of the two records is considered, one would usually seek to use a record generated by the same device in preference to a record generated by another device. However, the quality of the match for the latter record may be much higher, suggesting that this match should be relied upon instead of the same-device match. This is an example of a conflict between the quality characteristics and the indications of source.

The position information contained in a set of records will often be incomplete or contain errors. Causes of this may include a scarcity of observations; incomplete geographic coverage (that is, no observations in certain areas); and lack of reproducibility (for example, because transmitters have moved, been activated or deactivated). Likewise, there will always be a degree of uncertainty about the accuracy of the positions stored in the records (for example, because of measurement error).

The present invention attempts to improve the accuracy of position estimation by making optimal use of this limited, imperfect information.

An indication of the source of a record can be implicit or explicit. For example, the record itself may explicitly identify its source (such as the identity of a device which was responsible for generating it). Alternatively, the source of the record may be implicit in the way the record is stored or the way in which it is obtained. For example, the electronic device may have internal data storage means, in which it stores records comprising its own previous observations of wireless transmitters. Establishing the source of these records does not require a label, because it is implicitly known that any record in the internal data storage was generated by the device itself. In summary, the present method discriminates among records according to their sources; however, the source can be established in a wide variety of different ways.

According to some embodiments, the first record is stored in a first database and the second record is stored in a second database. The indication of the source of the record may therefore comprise an indication of the database in which the record is found. The second database is preferably a shared database, which is used by a group of devices to share their observations of the wireless environment. The first database may be an individual database, which is used by the electronic device to store the history of its own observations of the wireless environment. Thus, the databases are populated according the different sources of the records. The first database comprises records relating to one source, or set of sources; the second database comprises records relating to another source or set of sources. Indicating the identity of the database from which a match was retrieved is therefore equivalent to indicating the source of the record.

The present method then enables the intelligent integration of observation records in the first database (for example, observations generated by the device itself) with those shared by other devices (the second database). The method allows more optimal use of the available data. The position estimate can take into consideration the characteristics of each match, or can make a selection solely on the basis of which database the records were retrieved from. The quality characteristic can measure the specificity (or uniqueness) of the match. For example, the characteristic can capture the relative degree of certainty or uncertainty about the correctness or geographic accuracy of the match.

Herein, the word "database" is used to mean a set comprising a plurality of records. The set of records which makes up a database may be grouped physically or logically. Thus, for example, two different databases may be stored in the same physical storage device, as (logically) distinct subsets of records. Alternatively, two databases may be stored as separate physical databases, in different storage devices. In general, databases may be stored and accessed either locally or remotely (that is, from the same device, or between different devices).

The first database may preferably be a same-device, personal or private database. In other words, each record in the first database may comprise the identity of one or more wireless transmitters and the corresponding position may be based on a location at which the one or more transmitters were detected by the electronic device whose position is to be estimated. The first database is then inherently customized to the usage-pattern of the individual device because it contains only one set of observations—that is, those observations collected by the device itself. Such a database represents a history of the geographical movements of that device only.

Note that, in some embodiments, the position associated with a record is identically a location at which the one or more wireless transmitters were detected. In other embodiments, the position stored in the record may be different from a precise location where the transmitters were detected. For example, if a user-device detects a given transmitter repeatedly in different locations, the record may contain a position which is the average of these locations. In another example, the record may contain a position that is an estimate of the position of the transmitter itself, wherein the estimate of transmitter position has been inferred from one or more locations at which a device detected the transmitter's signals. In both these examples, the position stored in the record is not identical to any of the specific locations at which the transmitter was detected, but is nevertheless based on them.

Where a record comprises the identity of more than one transmitter, it is not essential that all of these transmitters were observed by a single device, at a single place and time. Isolated observations may be aggregated into a smaller number of records. For example, if one device observes a transmitter T1 at a location P1 and another device observes a transmitter T2 at a nearby location P2, this may be represented by a record which contains the identities {T1, T2}, associated with a position P, where P is based on P1 and/or P2. The position P stored in the record might be: the average of P1 and P2; a quantized version of P1 and/or P2; or may be based on P1 and/or P2 in some other way.

The group of devices contributing to a shared, second database may preferably include the individual device. Alternatively, the second database may be constructed using devices in a group to which the individual device belongs, but wherein only records contributed by the other devices in the group are used by the individual device. (For example, because the records of the individual device itself are already considered in the first database, so there is no need to duplicate them in the second database).

In some embodiments, both the first and second databases are shared databases, populated with records generated by multiple different devices. Optionally, the contents of the first database may correspond to a smaller, more limited or more specific group, whereas the contents of the second database may correspond to a broader, larger or less-specific grouping. The more specific grouping associated with the first database is chosen so as to be more relevant to the observations of the electronic device whose position is to be estimated.

More generally, the first and second database can merely comprise different sets of records, wherein the different sets have (or are expected to have) different relevance to the observations of the electronic device in question.

Relevance to the observations of the subject electronic device is typically established by a group of contributor devices (or their users) having some attribute in common with the electronic device, such as devices built with similar hardware, running similar software or used in a similar way; or users who have similar movement patterns (as already mentioned previously, above). Therefore, the indication of the source of a matched record may indicate that the record came from a device that is similar to the subject electronic device in one of these ways.

The more selective the group, the more specific it is (in terms of locations visited and/or properties of the device), and so the more likely it is that a position estimate based on the records of similar such devices corresponds closely to the actual position of the device.

The more general the group is, the higher the chances of a match among records of that group (that is, there is a greater likelihood that a given wireless transmitter or set of transmitters will have been seen before). Therefore, there is more likely to be information that can lead to a position estimate, and that position estimate is likely to be based on more observations and potentially therefore more exact. However, such an exact estimate based on shared or generic data might be incorrect or misleading for the particular individual device, because of its different properties or usage.

The first and second matches, between the observation and respective first and second records may be unique (that is, matching identically) or partial (non-unique) matches. A partial match could be determined where more than one transmitter is detected (in the observation), but only a subset of the transmitter-identities match a given record. Conversely, one or more transmitters may be detected, but no record is found containing only those transmitters (and no others). Alternatively, a partial match could be defined for a single detected transmitter, wherein the identity of the transmitter matches the identity of a single transmitter in a stored record to a limited extent.

In some embodiments, a joint consideration of quality characteristics of the matches together with the source of the match enables the information stored in the records to be combined in more subtle ways, making fuller use of the available knowledge, when calculating the position estimate. By considering the different records carefully, inferences can be drawn about the best way to deduce the device's position. This can lead to improved precision in position estimation.

At least one of the first and second indications may comprise a label in the respective matched record.

Each match may be retrieved along with a label indicating the database (or type of database) to which the corresponding matched record belongs—or a label indicating the source from which the record was contributed. This can facilitate an implementation in which all the records are stored in a single, unified database and each record is annotated with an indication of the device; software; username; or group (among others) with which the record is associated. Other examples of useful labels may include device serial number, manufacturer code, model type number, and software version number. Then, instead of two separate queries to two separate databases, the method can simply compare the observation with the contents of the single, unified database. All the matches found in this database will be retrieved; however, the labels associated with each match will enable them to be treated differently when estimating the position of the electronic device. In this case, the label associated with each record enables separate logical databases to be defined, even though all the records may be stored in the same physical database. Indeed, this implementation may be more flexible than storing the records in disjoint databases, because the definition of each database (that is, the assignment of records to the database) or selection of which sources of data to use can be modified simply by adjusting the way the labels are interpreted. For example, if each record contains a label indicating the identity of the user-device which was responsible for creating the record, then the first database could be defined by selecting only (matching) records which have the same user-device label as the electronic device.

The method may further comprise, before the step of comparing the observation with the contents of the second, shared database, selecting the second, shared database from among a plurality of possible shared databases. Put another way, the method may comprise selecting a set of records with which the observation should be compared, before performing the comparison. This selection may be made according to the indications of the sources of the records.

The selection may additionally be made in dependence upon external information (that is, other than information about the source), whereby a different set of records may be selected according to different situations. This external information may include information about the temporal context, such as a date; day of the week; or time of day. To facilitate this further, a record may additionally comprise data providing such "external" contextual information about the circumstances in which it was generated—for example a time-stamp annotation indicating the time that the observation was made. This can then be compared with the information about the external context of the current observation to select records.

Here, a distinction can be drawn between an indication of source, on the one hand, and temporal context, on the other hand. An indication of source represents the "internal" or "intrinsic" context in which a record was generated, and is particular to a contributor—specific information describing a device; user; or software application, for example. Temporal context is part of the "external" or "extrinsic" context of a contribution—the information that is common to all devices, including time and environmental attributes like ambient temperature, and so on.

In one instance, the second database could be defined by selecting records associated with business-colleagues of the user of the electronic device. However, on a different occasion, the second database could be defined by selecting records associated with the family and friends of the user of the electronic device. This flexibility recognises that geographic data from different groups may be appropriate to a given user for different purposes.

In some embodiments, the quality characteristic of each match depends on the similarity between the set of currently observed identities and the identities found in the matched record.

The quality characteristic of the first match and second match may comprise a measure of how specific each match is, preferably comprising at least one of: a degree of similarity between the set of at least one identity comprised in the observation and the set of one or more identities comprised in the matched record; and a degree of geographic precision implied by the match.

The degree of geographic precision may be based—at least in part—on the number of different transmitters that are matched (between the observation and the record). In general, the greater the number of transmitters detected, the more precise the position estimate, because of the implication that the device is located at an intersection between the coverage patterns of all the transmitters observed. In addition or alternatively, the degree of geographic precision may be based on knowledge of the extent of geographic coverage of individual transmitters. For example, detection of a micro-cell or pico-cell in a cellular network implies a higher degree of geographic precision than detection of a macro-cell.

As the present inventors have recognised, differences in the specificity of the match can be exploited to give more refined control of how matches from different databases are combined. A more specific match may be preferred, even if the source of the corresponding record is less closely related to the subject electronic device. Likewise, in an implementation using two databases, a more specific match in the more generic of the two databases may override the preference to use the more personalised database.

The identity of each transmitter may have a hierarchical structure, whereby successive levels of the hierarchy correspond to successively more limited geographic areas; and the measure of specificity of the match may be based on the degree of similarity between the hierarchical identity of the at least one transmitter in the observation and hierarchical identity of the one or more transmitters in the matched record.

An example of a hierarchical identity is the Cell Global Identification (CGI) a cellular telephone system such as GSM. This is composed of a set of code numbers, indicating the country; network; area; and finally individual cell identity. For a full or unique match, the same cellular base station must be detected—in this case, every element of the identity matches, between the observation and database record. However, all the base stations in a particular geographic region share the same code for area (Local Area Code—LAC). Therefore, detection of a base station with same LAC gives rise to a partial match. Detection of a base station with different Cell Identity (CI) and LAC, but in the same country (Mobile Country Code—MCC) is also a partial match, but is less specific than an area match, because it only indicates that the observed base station is located in the same country as the one referenced in the database record. In this way, the number of elements of the hierarchical identity which match can be used to determine the specificity of the match.

In general, the indication of the source of a record may indicate an individual, an item of hardware, or a piece of software which generated the record by making an observation of the wireless environment (or which caused the record to be generated in this way). It may equally indicate a group or class of related entities to which such an individual, hardware-device, or software-application belongs. In other words, the indication of source or origin of the record is information concerning who or what caused the record to be created. Software causing an observation to be made may be software running on the device which makes the observation, or may be a network service to which the device is connected (for example, in the case of a "thin client" type of device).

At least one of the first and second indications of source may indicate at least one of: the identity of one or more devices which contributed to the record by having detected the one or more transmitters at the location or set of locations; the identity of one or more software programs which caused said one or more devices to contribute the record and a group to which said one or more devices or software programs belong, wherein said group is preferably associated with at least one of: a type of said one or more devices or software programs; and a user or group of users with which said one or more devices or software programs are associated.

These provide different ways to establish an indication of the source of a record. As noted previously above, the indication of source may be determined implicitly or explicitly. When the indication indicates a group of devices, software applications, or users from which the record originates, the group preferably has attributes in common with the subject electronic device. This should result in the records of the group having greater relevance when estimating the position of the electronic device: if one or more members of the group have observed a given set of wireless transmitters when at a particular location, then when the electronic device observes the same set of transmitters, it is likely to be in the same place, for example because the device is either physically or electrically similar to or is used in a similar way to the devices of the group.

Groups of devices may therefore be characterised by the type of the device or by the type of user. Knowing the identity of a contributing device or having an indication of a group to which it belongs can therefore be a proxy for knowing something about the geographic usage pattern of the device or the properties of the device which may have affected how it contributed to the record (for example, how it detected the transmitters and how it obtained its position).

Groups of software applications might be characterised by the software provider, or by their purpose. For example, a set of business-related software applications might be grouped together, while games and media applications might form another group.

The present inventors have recognised that different devices, users and groups may observe the same transmitters from different positions. However, the same individual, or members of the same group are more likely to observe the same transmitters from the same position. This is one example of what is meant by the relevance of a record contributed from a particular source. In the foregoing example, the relevance arises because of devices being used in a similar geographic pattern. Relevance may also arise in other ways—for example, because of similar physical or electrical attributes of the device. This aspect of relevance will be described in further detail later below.

The first indication optionally indicates that the source of the first record is the electronic device itself; and preferably the second indication indicates that the source of the second record is one or more devices among a limited group of devices.

In this case, the first record is a same-device record and the second record is one shared by another device. The other device is preferably one of a limited group of devices, whose records are expected to be more relevant for calculating the position of the subject electronic device.

The first and second indications optionally suggest that the first record originates from a source that is more closely related to the electronic device than the source of the second record, wherein: if the second match is more specific than the first match, then the estimation of the position of the electronic device is based preferentially on the second position; otherwise the estimation is based preferentially on the first position.

If the first match is more precise than the second or if the two matches are judged to be equally precise, then the final position estimate is based preferentially on the first position. In other words, all else being equal, the first position (corresponding to the more closely related source) will have greater influence on the final position estimate. On the contrary, if the second match (which is based on the less closely related source) is more specific than the first, then it may be appropriate for the second position estimate to dominate the final position estimate. This provides one simple but useful and general heuristic for jointly considering the specificity of the match and its source.

The step of estimating the position of the electronic device may comprise a linear or non-linear combination of the first and second positions.

The position corresponding to each match may be assigned a priority, the priorities optionally being based jointly on: the measure of specificity of the match; and the indication of the origin of the matched record (for example, the database from which the record comes). The step of estimating the position of the electronic device can then comprise selecting the position estimate having the highest priority. This is an example of a non-linear method of combination.

Alternatively, the position corresponding to each match may be assigned a weight, the weights optionally being based jointly on: the measure of specificity of the match; and the indication of source. The step of estimating the position of the electronic device can then comprise calculating a weighted average of the position estimates according to the assigned weights. This is an example of a linear method of combination.

The first and second indications may suggest that the first record originates from a source that is relatively more closely related to the electronic device if the source device and the electronic device are part of a group of related devices expected: to have contributed database records for positions at approximately the position to be estimated; and/or to have contributed database records by making observations in approximately the same way as the electronic device.

In the first case, the group of devices may have a common purpose—for example, a group of tracking devices associated with a fleet of courier vehicles will be likely to visit repeatedly the addresses of their clients and the origins and destinations of consignments.

In the second case, the group of devices may have common components or may be used in a similar manner. The group of devices may be of the same physical type or form-factor; may have the same physical or electrical properties; or may be packaged in a similar body.

For example, all the portable navigation devices of a particular manufacturer may use the same antenna; radio chipset; or software calculations for making signal measurements. Since the signal observations are all made in the same manner, the observations made by one of the devices are more likely to match records contributed by another device of the same group, as compared with records contributed by another manufacturer's device. This should lead to more accurate matches, and therefore better position estimation.

This contrasts with known wireless beacon databases of the prior art, which have been generated by different users conducting "war-drives". In those databases, each contributor will have used different hardware to make the necessary signal measurements, without calibration or control, leading to unknown fluctuations in the data. Embodiments of the present invention can mitigate the effects of such fluctuations, by using records of similar devices where possible.

In another example, all laptop devices could be assigned to one group and all mobile phone devices could be assigned to another group. Since these devices are used in different characteristic orientations, and have different form factors, the signal observations they make may be different from one another. Likewise, they may be used in different locations (for example, a mobile phone may be switched on in a cinema or theatre, where a notebook computer is unlikely to be used). In addition, these different types of device may have different hardware and software components, as already noted above.

The class of devices from which the first record originates may be more tightly defined than a broader class of devices from which the second record originates, such that the records in the first database are expected to be more relevant than those of the second. Alternatively, the first and second databases may be expected to be equally relevant, but for different reasons or in different ways.

Alternatively, instead of being associated with a specific group or sub-group of devices, the second record may be generic—that is, it may contain any observation data from any device available.

In some embodiments, the first database may comprise a subset of the records contained in the second database.

The method may further comprise detecting a third match with a third record. In this case, the source of the third match may be a device that is unrelated to the subject electronic device. In the context of an implementation using first and second databases, the third match may be found in a third database. The third database may be global (that is, universal or generic), in that it contains records contributed by any device. That is, whereas the first and second databases may comprise selected records only, the third database may comprise all records available, without limitation to a specific device or specific group of devices. Accordingly, the first to third databases may be progressively larger and/or more general.

Note that different manufacturers or service providers might implement their own databases. In this case, two different providers may provide two different generic or "universal" databases. This should not be taken as a contradiction in terms—although neither database each database is strictly universal, because each will contain records unique to one provider, they are still generic databases in the sense that they incorporate all data made available by the respective provider, without discrimination.

The method may further comprise detecting multiple matches with records having the same indication of source; and estimating the position of the electronic device may be based on at least one of the corresponding multiple position estimates, depending upon quality characteristics of each of the multiple matches.

This extends the method to use multiple matches from the same source, when these are available.

The method may further comprise submitting data to the plurality of records, the data comprising: the observation; an estimate of the position of the electronic device; and preferably a label identifying at least one of: the electronic device; its type; or a group of devices to which it belongs.

This enables the set of records to be constructed or updated. The estimate of position may be calculated by means of wireless signal observations, as described above. Alternatively, the estimate may be obtained by other means. Preferably, a trusted estimate of position such as a GPS position fix is used, to ensure accuracy of the records.

Depending on the type of wireless transmitter observed, the signal environment in a particular location may change over time. For example, cellular base stations may be reconfigured, added or removed. Wireless LAN (WLAN/WiFi) hotspots may be turned on or off depending on the time of day, or may be moved from one site to another. In such cases, updates provided by devices in the field can help to ensure that the set of records remains accurate.

If a label is included with the submission, this can be used subsequently to identify how the data can best be used. Data submitted by a device may be used to construct a database consisting only of that device's own observations, for example. Likewise, having a label permits easy and adaptable definition of groups of devices whose observations should be used to construct a particular shared database.

As will be apparent to those skilled in the art, it may not be necessary to transmit a label with every submission of data from a device. For example, in the case of communication with a remote database, in order to reduce redundancy, the device may register its label with a database in an initial handshake or configuration stage. Then, any subsequent submissions from the same device would be assigned the same label. This can reduce the bandwidth of a communications link between the device and database, by avoiding repetition of labels.

The label may be submitted together with the observation and/or estimate of position, or separately. For example, the label could be provided in a separate configuration phase, and via a different interface. For example, a user may connect to a server computer separately and label his/her portion of the data at a different date or time from the date or time that the observation data was submitted.

A device may have multiple labels—for example, an individual label and one or more labels pertaining to groups to which the device belongs. A device may use a different label for submissions of records, according to context. For example, observations made while the device is connected to a corporate Virtual Private Network (VPN) could be stored with a "business" label; meanwhile, observations recorded while the device is being used to watch a movie or listen to music could be associated with a "leisure" label.

Also provided is a computer program comprising computer program code means adapted to perform all the steps of a method as described above if said program is run on a computer; and such a computer program embodied on a computer readable medium.

According to another aspect of the invention, there is provided a portable device, comprising:
   a wireless receiver, adapted to observe the identity of at leas one wireless transmitter detectable by the device at a position to be estimated;
   a query processor, operable to issue the observed identity as a query to be compared with a plurality of records, each record comprising the identity of one or more wireless transmitters and a corresponding position, the position being based on a location or set of locations at which the one or more transmitters were detected,
   the query processor being operable to receive, in response to the query, the result of a first match between the observation and a first one of the records, the result comprising:
      a first indication of the source of the first record;
      a first position estimate, being the position corresponding to the first record,
   the query processor also being operable to receive, in response to the query, the result of a second match between the observation and a second one of the records, the result comprising:
      a second indication of the source of the second record, wherein the second indication is different from the first indication;
      a second position estimate, being the position corresponding to the second record; and
   a position estimator, adapted to estimate the position of the portable device based on at least one of the first position estimate and the second position estimate, depending upon the first indication and the second indication.

The portable device may be a personal navigation device. However, it could also be any other kind of device in which it is desired to implement positioning functionality. This might include, for example a mobile phone; vehicle or package tracking device; or a portable computer.

The portable device may further comprise an onboard memory, for storing the whole or part of the plurality of records.

Records stored in an internal memory may be those generated by the device itself, for example. The device may be also adapted to store the whole or part of a wider set of records, such as shared records from the second, shared database (or third database, respectively). Optionally, a master database may be stored remotely, and the device may be adapted to intermittently or periodically download updates to the database.

BRIEF DESCRIPTION OF THE DRAWINGS

The invention will now be described by way of example with reference to the accompanying drawings, in which.

DETAILED DESCRIPTION

In the following exemplary embodiments, the invention will be described with reference to the storage of records in first and second databases. However, as already explained above, the invention is not limited to such embodiments. Retrieving records from first and second databases is merely one suitable way of establishing an indication of the source of the records, so that the records can be used appropriately in the method.

Figure 1:
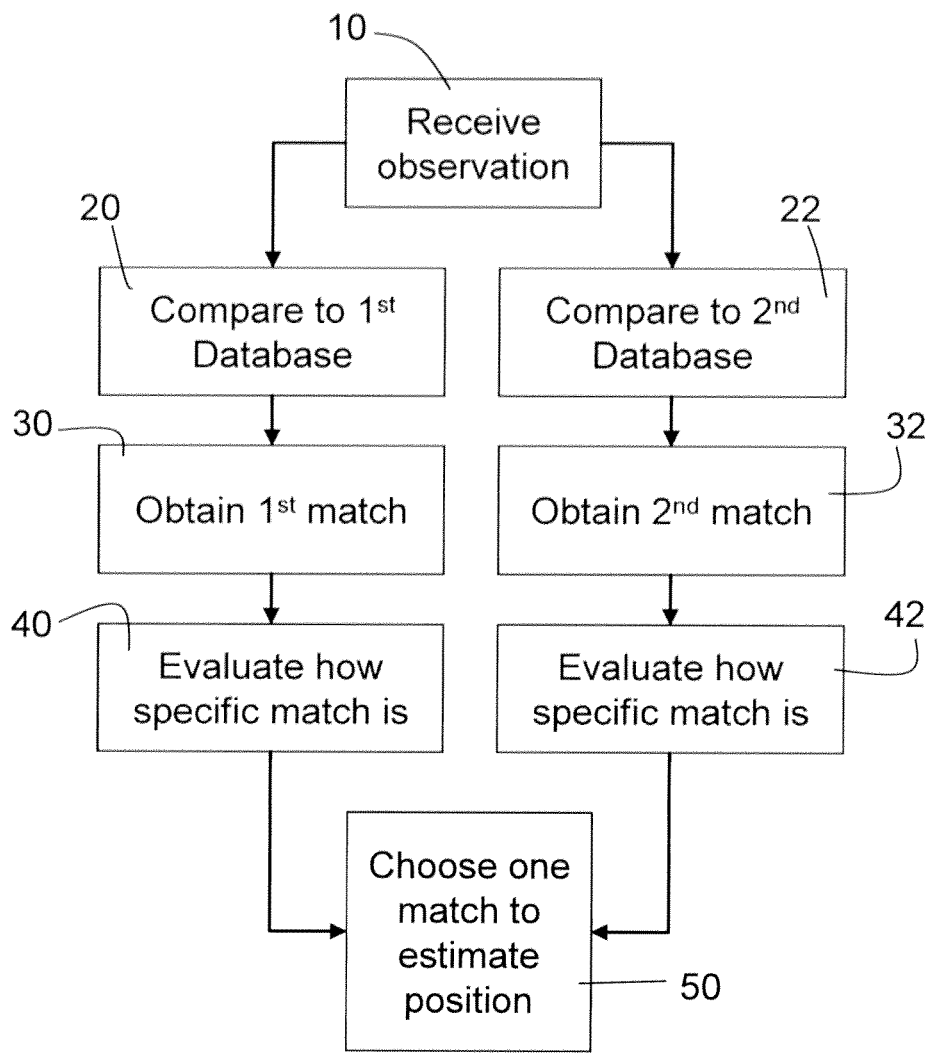
FIG. 1 is a flowchart of a method of estimating position according to a first embodiment of the invention.

A method according to a first embodiment of the invention will now be described, with reference to FIG. 1. The method starts by receiving 10 an observation. The observation comprises the identity of one or more wireless transmitters detected by a user-device at a position which it is desired to estimate. The observation is compared 20 with the contents of a first database. This database comprises a plurality of records, each of which comprises the identity of a transmitter or transmitters detected at a different time, and the known position at which the detection occurred. Thus, each record in the database comprises an observation like the presently received observation, but with an associated position.

The method detects 30 a first match between the presently received observation and one of the records in the first database. The corresponding position stored in the database is retrieved, along with additional information about a characteristic of the match. Of course, if more than one record in the first database matches the observation, more than one match may be retrieved in this way.

The observation is also compared 22 with the contents of a second database, in a similar manner. This results in (at least)

a second match 32, for which the associated position and match-characteristic are also retrieved. As shown in FIG. 1, the comparison 20, 22 and matching 30, 32 with the respective databases is performed in parallel, although this is not essential. The observation can also be compared with third database, to produce a third match, in the same way.

Using the retrieved characteristics of the retrieved matches, the method chooses 50 one of the matches to estimate the position of the user-device. In this embodiment, each match is evaluated 40, 42 to determined how specific it is, with respect to the observation. In this embodiment, the choice of match to use for position estimation depends both on the specificity and on the database in which the match was made. In other embodiments, the choice may depend solely upon the database (that is, upon the source of the record giving rise to the match).

The first database comprises previous observations made by the user-device itself. The second database comprises observations made by other devices in a group to which the user-device belongs. The third database is a global database, comprising all records available, regardless of whether the device that made the observation had any similarity or relationship with the present user-device. In this way, the first to third databases are increasingly more comprehensive, but potentially less relevant to the needs of the present user-device.

In this example, the device is a tracking device attached to a parcel. The three databases are defined as follows:
1. All previous locations of the device (that is, the particular package in question);
2. All package locations (for the same shipping company);
3. All locations available for the shipping company (for example, including package labels, delivery vehicles, staff, and so on).

As will be apparent to those skilled in the art, additional levels (databases) could be defined. Intermediate levels of generality might include a more specific version of the second database, comprising all package locations of a certain size. At the most general level, an additional database could be defined which includes all records available to the location-service provider. This would include locations for other shipping companies as well as other types of user. Without loss of generality, in the following description, we will consider the case of three databases (or levels of database), as explained above.

In this embodiment, the electronic device observes cellular telephony base stations, such as Global System for Mobile Communications (GSM) base stations. Each Base Station (BS) broadcasts a Cell Global Identification (CGI). The composition of this is as follows:

{[MCC][MNC][LAC][CI]}

A Mobile Network Code (MNC) is used in combination with a Mobile Country Code (MCC) to identify uniquely a mobile phone operator using the GSM, CDMA, iDEN, TETRA or UMTS public land mobile networks. (This identification system also applies to some satellite mobile networks.) Within each network, a set of location areas is identified by a common Location Area Code (LAC), which is a fixed two-octet number. The Cell Identity (CI) identifies the cell within a Location Area and is also a fixed two-octet number. The full CGI therefore globally identifies a cell.

The presently received observation may match a record in the database at the cell level, whereby the CGI of the base station matches identically, or partially, whereby only part of the hierarchical identifier matches. A partial match may include a matching MCC only; or a matching MCC and LAC. The more complete the match (in terms of the level to which the CGIs match), the more geographically specific it is.

It is assumed that the records in the first database are the most relevant or useful for establishing the device location. That is, the history of locations of the user-device is more relevant than the history of locations of other devices. However, when the device moves to a new location for the first time, there may be no match in the first database, or only a partial match. According to this embodiment, the specificity of the match (in terms of CGI) is combined with its origin (in terms of database) by using a table of joint priorities, as shown below:

|  | Cell | Area | Country |
|---|---|---|---|
| Individual | 1 | 4 | 7 |
| Group | 2 | 5 | 8 |
| All | 3 | 6 | 9 |

As shown in this table, the top priority (1) is assigned to a cell-level match retrieved from the individual database (first database). In this event, the device has seen exactly the same base station before, and the position corresponding to that database record should be used to estimate the current position of the device. The next two preferences (2, 3) are cell-specific matches retrieved from the second and third databases (Group. All) respectively. If no cell-specific match is found in any of the three databases, the next highest priority is given to an area-level match in the first (individual) database. This means that device has seen a base station with the same MCC. MCC and LAC before; therefore, it is in the same region. The resulting position estimate may be less accurate than a cell-specific match; however, the inaccuracy may be limited, at least initially. For example, this situation may first arise when the device travels out of a first cell which it recognises, into a second, neighbouring cell, which is unrecognised, but shares the same LAC. According to the present embodiment, the position of the device will be reported as the location in the first cell where that base-station was observed, since this is the location stored in the database for that cell. The error in this estimate will be of the order of the size of one cell. This will typically be much more accurate than if a generic position estimate had been used—for example, based on the centroid of all observations (by other devices) which include the same LAC; or based on prior knowledge of the regions encompassed by the LACs for each cellular network. In this way, the present embodiment can provide improved position estimates that are more relevant to the pattern of movement of the individual device.

If the LAC has not been observed by the present device, the second database may have returned a match with a record generated by another device. Since the second database covers devices related to the present device (whose position is being estimated) it may also yield very relevant results. In the current example, another package carried by the same shipping company may previously have observed the same LAC. If that other package was following the same trajectory as the present package, the position estimate will turn out to be very accurate. In this way, the present embodiment prioritises the use of information so that the best possible position estimate can be provided.

In the first embodiment, described above, the position estimate was based on a non-linear combination of the position estimates of the matching records, by choosing between the matches on the basis of priority.

Figure 2:
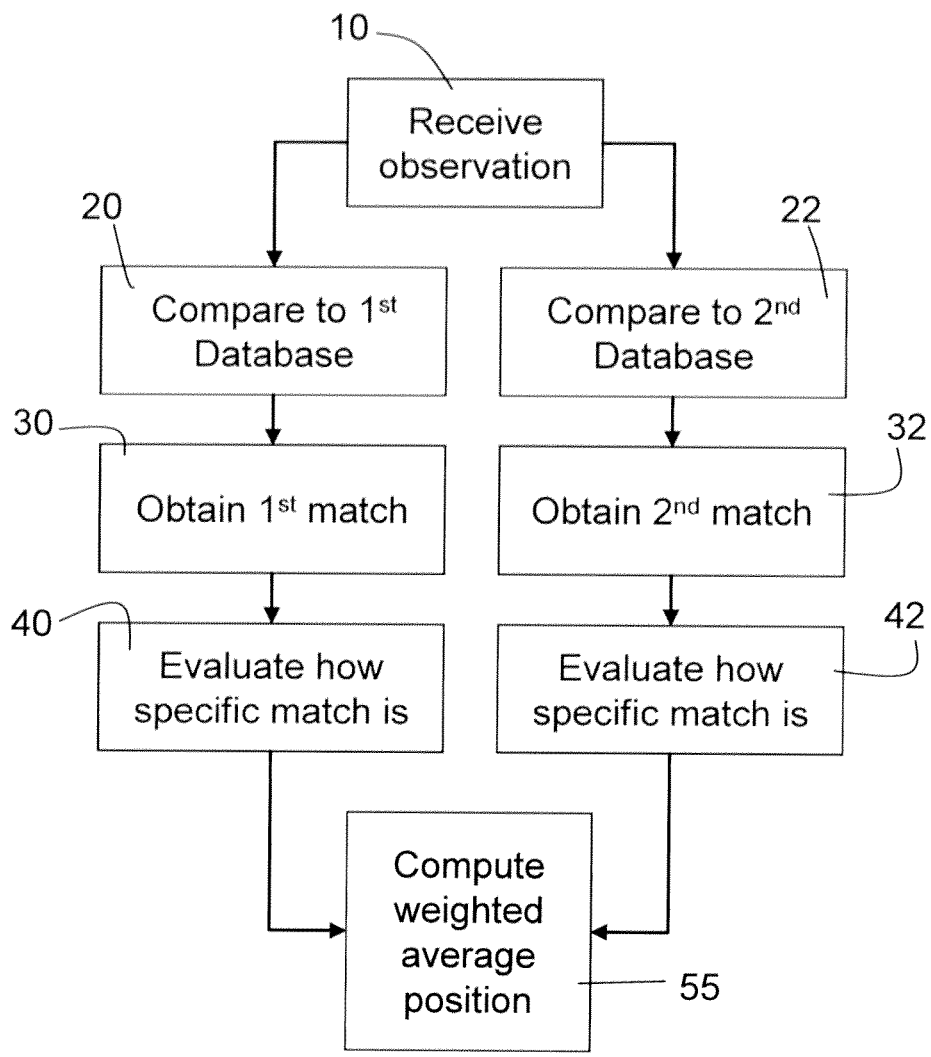
FIG. 2 is a flowchart of a method according to a second embodiment.

A method according to a second embodiment will now be described, with reference to FIG. 2. In this embodiment, the position estimate is based on a weighted linear combination of position estimates. As shown in FIG. 2, the steps of this method are identical to those of the first embodiment, as regards receiving 10 the observation; comparing 20, 22 with the databases; obtaining 30, 32 matches; and evaluating 40, 42 how specific each match is. The step 55 of estimating the position is different.

Instead of a table of joint priorities, as explained previously above, the second embodiment uses a table of weights, as follows:

|  | Cell | Area | Country |
|---|---|---|---|
| Individual | 10 | 3 | 2 |
| Group | 3 | 1 | 1 |
| All | 2 | 1 | 1 |

The matches are then combined using a weighted average of the corresponding positions. Thus, for example, a cell-specific (exact) match with a record in the second (group) database attracts a weight of 3, while a partial match only to the extent of the LAC and in the same database attracts a weight of 1. Consequently, the position estimate will be based preferentially on the cell-specific match, as this will be weighted three times more heavily when calculating the average (for example, centroid) of the positions to which the matched records correspond.

Geographic matching is uncertain, and the wireless transmitters may have irregular and changing coverage patterns. For this reason, position estimates calculated by weighted averaging—as in this embodiment—may provide additional robustness and/or stability, because the estimated position is based on more than one record in the databases. Using weights also enables different types of information to be given equal influence. For example, in the table above, a matching LAC in the first (individual) database is given the same weight as a matching cell in the second (shared, group) database.

Figure 3:
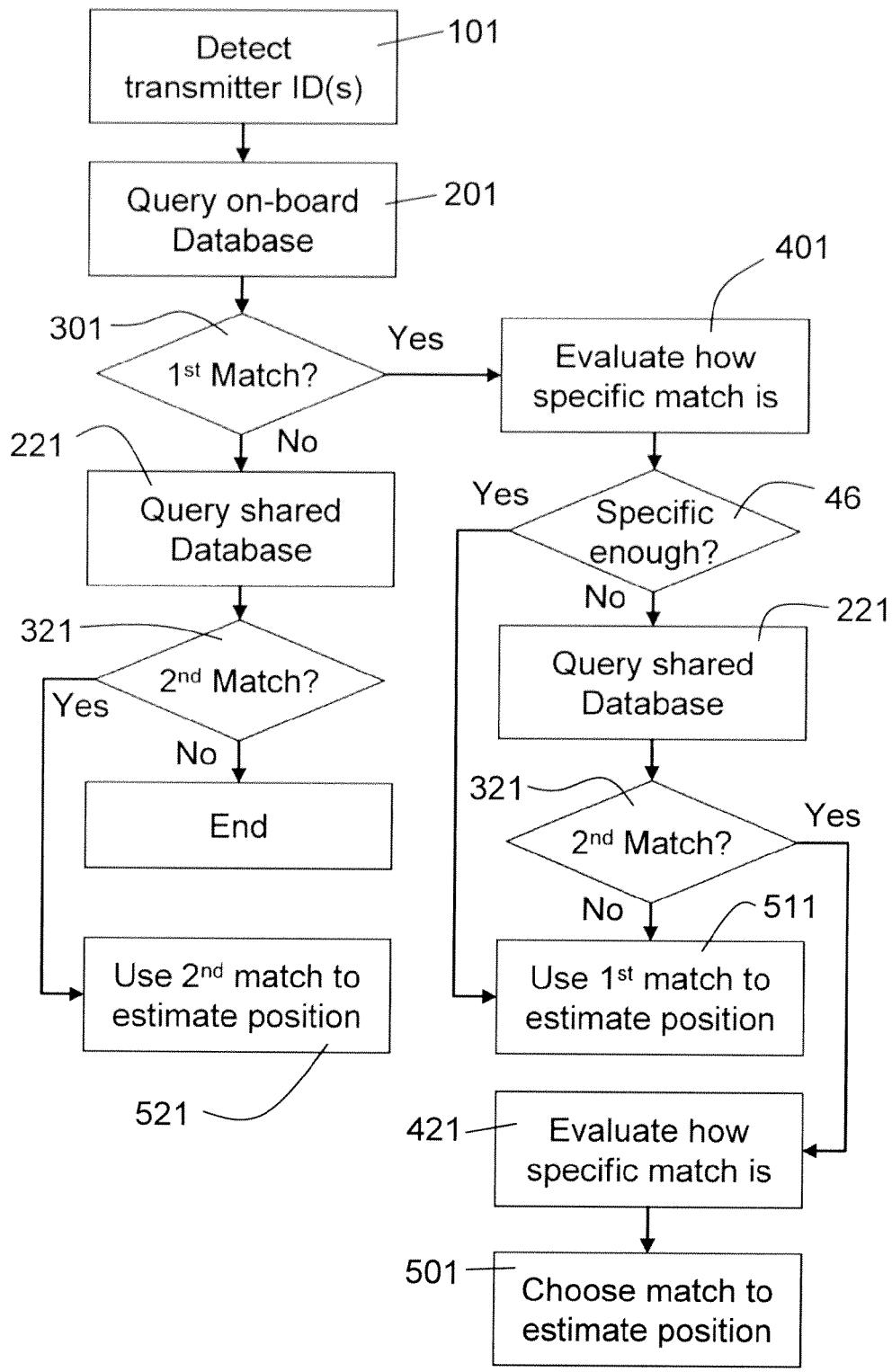
FIG. 3 is a flowchart of a method according to a third embodiment.
Figure 4:
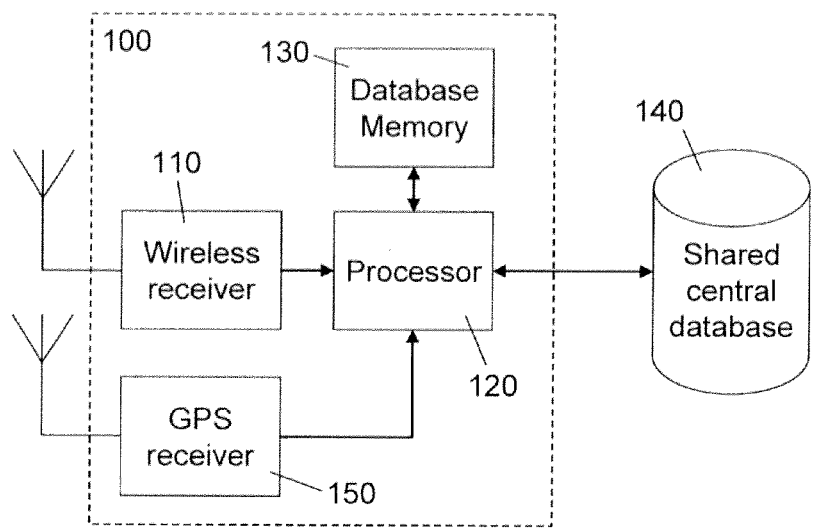
FIG. 4 illustrates an apparatus according to an embodiment of the invention.

FIG. 3 illustrates a method according to a third embodiment of the invention. This embodiment uses heuristic rules to decide how to estimate the position, based on the available information. Like the first two embodiments, described already above, the method takes account of both the quality of the match and the database from which it came. According to this embodiment, the method of FIG. 3 is performed on board a portable Personal Navigation Device (PND), whose block diagram is shown in FIG. 4.

In step 101, the device 100 takes a sounding of the wireless environment, to detect and identify the transmitters from which signals are received. Wireless receiver 110 is used to make this observation. The resulting identities of wireless transmitters detected are provided to a processor 120.

The processor uses the set of identities to query 210 a first, on-board database 130, which stores the records of wireless observations made previously by the device (together with the corresponding positions at which the observations were made). The processor determines 301 if a match exists in the first database 130. If so, the method proceeds by evaluating 401 how specific this match is. This can be done in the same manner as for the first two embodiments: that is, the degree to which the CGI of the observed transmitter matches the CGI stored in the database is considered. The processor decides 46 if the match is specific enough—for example, if the match is a unique, cell-specific match, having exactly the same CGI. If it is, this first match is chosen 511 to estimate the position of the device.

If the first match is deemed not to be specific enough (for example, because it only matches to the extent of the LAC) then the processor 120 issues a query 221 to a second, separate database 140. In this example, the second database 140 is a generic, shared database, stored at a remote central server. The PND communicates with the server 140 using a wireless data connection, such as a WLAN, GPRS, or UMTS connection. The processor checks 321 if a match (hereinafter the second match) is received from the central database 140. If so, the processor evaluates 421 the specificity of this match. The processor now has available two matches—one from each database—with associated indications of how specific each match is. By comparing the specificity of the matches, the processor chooses 501 which match should be used as the basis for estimating the position of the PND. The selection may involve the use of a table of priorities, as described above for the first embodiment.

If, in step 301, there is no first match found in the first (on-board, custom) database, the method proceeds to a similar step 221, wherein the second, shared database is queried. If 321 there is no second match from the shared database, the method ends, because no matching records can be found in any database. If 321 a second match has been found, this match is used 521 to estimate the position of the PND. Since no first match has been found, in this branch of the method, there is no need to evaluate the specificity of the second match, or to choose a match for position estimation.

The method of this embodiment has been described with reference to a single match from either or both of the two databases. However, those skilled in the art will by now readily understand how the method can be extended to the case of multiple matches in each database.

The PND 100 of the third embodiment also comprises a GPS receiver 150. This is used in conjunction with the wireless receiver 110 to populate the on-board database memory 130 and also the shared central database 140. When GPS satellite reception is available, the device can measure its position using the GPS receiver 150. At the same time, the wireless receiver 110 detects signals from nearby wireless transmitters and identifies them. The identities and position are associated with one another and stored in the database 130. When the device next connects to the central, shared database 140, the new record can be uploaded to that database. The new record in the shared database can be annotated with a label which identifies the particular PND 100 which submitted it. This enables each PND to access only the records of other PNDs, when using the central database 140 for position estimation.

In a variation of this embodiment, the on-board database 130 is omitted and all records are stored in the shared database 140. With this variation, the first, custom database is composed of a logical subset of the records in the shared database—namely, those which are labelled as having been submitted by the same PND 100. In this case, the PND may transmit the current observation to the database server 140 as a query, together with a label identifying the particular PND making the request (and/or a group to which it belongs). This label enables the server to select the appropriate records to constitute each logical database.

In an alternative variation, part of or the whole of the shared database 140 may be stored in the memory 130 of the PND 100. This means that the PND 100 does not need to establish a data connection to the remote server 140 each time it wishes to query the shared database. Preferably, updates to the shared database are downloaded, or otherwise delivered, to the PND on-board memory 130 periodically.

It is expected that the databases would evolve over time. Thus, it is not necessary to provide at the outset a fully populated database of locations, and transmitters observable from those locations. Evolution of the databases will also help the system to adapt as the wireless environment changes—for example as transmitters appear and disappear. The following usage scenarios illustrate these points:

Case 1. At an early stage, when a user enters an area not previously visited by any other user.

The shared database consists of data from several different individual users, but without much overlap between users, because they make different journeys, and use the position estimation service and submit records to the database in different places.

In a particular usage location there is then little difference between the shared/aggregate database and the individual user's personal database.

The individual user's repeated usage then gives high priority and high weighting results, but this has little impact on the position estimates since limited data is available anyway, at this stage.

Case 2. In the medium term, there is a sparse database from a limited but increasing number of users, and the system is seeking clues about where the user is when the device goes into a possibly new area.

Any information is welcome

If the device has seen any of the information before—any match, even on a single cell identity or a LAC indicates that he is probably in the same place as when this signal was seen previously, and this is the best estimate of location.

If there is no match of any information from the device, then a match from a group-shared or general aggregate database (to whatever accuracy of information is available) is the best that can be done, and should be used.

Case 3. In the long term, lots of information will be available (possibly even conflicting information).

A match with a report of multiple cell descriptors at the same time is likely to correspond to a fairly limited geographic area, and so will be relatively accurate. This is true even if the database record originates from another user in a shared or aggregate database, rather than the individual database of the device itself.

So an aggregate generic match with a record which originated from another device may be preferable, compared with an individual match comprising a subset of the observed base stations or with a matching LAC.

A unique match with multiple previous observations from the user's own device would be better still.

The embodiments above have used the example of cellular base stations as the wireless transmitters used to localize the position of a device. The base stations were identified using CGI. However, for completeness, it is noted that cellular base stations may be identified in other ways. Each base-station also has its own Base Station Identity Code (BSIC). This code is at all times transmitted on the broadcast channel, so that Mobile Stations can distinguish between base stations. The BSIC is composed of a 3-bit Network Colour Code (NCC) and a 3-bit Base station Colour Code (BCC). The NCC is assigned to each network operator so that the MS can easily determine the BSs which it is allowed to access. The NCC of different providers accessible from a given location must be different. This includes locations near national borders, where BSs of providers in more than one country are accessible. The BCC of each base station is assigned by the network operator. They are chosen so that no neighbouring base stations have equal BCC and thus equal BSIC. The effect of this is that observing a given BSIC, although not a globally unique identifier of a particular cell, reduces the set of possible locations to a finite number of cells having the same NCC and BCC. If the BSICs of multiple base stations can be detected, these can be used to narrow the set of possibilities still further. With a sufficient number of detected BSICs, a method according to an embodiment may be able to narrow the range of possibilities down to a unique match in one or other of the databases. Assuming that this unique match originates from an individual or group database, there is good reason to suspect that the present position corresponds to that stored in the database record, even though there may in theory be other locations in the world where an identical set of BSICs could be observed.

Of course, as those skilled in the art will appreciate, transmitters of other kinds can also be used to locate a device, according to other embodiments. For example, WLAN ("Wi-Fi") Access Points (APs) can act as suitable wireless beacons, in a similar manner to the cellular base stations. Every AP has a unique Media Access Control (MAC) address, which can be discovered by a WLAN client communicating with the AP. In this example, therefore, the wireless receiver 110 in FIG. 4 would be a WLAN interface. Other suitable types of beacon may include FM radio transmitters, which typically transmit digital station identification information according to the Radio Data System (RDS) or another similar standard. Likewise, many other terrestrial and satellite broadcasts include identification information which could be used in other embodiments. In principle, any wireless signal (including electromagnetic waves of all types, and other free-space propagating signals such as acoustic vibrations) could be used, provided its source can be identified and it is receivable in a finite geographical area.

It is often possible to observe multiple wireless transmitters of any given type from a single location. In this case, it may be useful to compute a set-theoretic measure of similarity between the observed set of beacons and the set of identities stored in the database. This measure can be used instead of, or in addition to, the measure of specificity defined above for hierarchical identifiers such as CGI.

Figure 5:
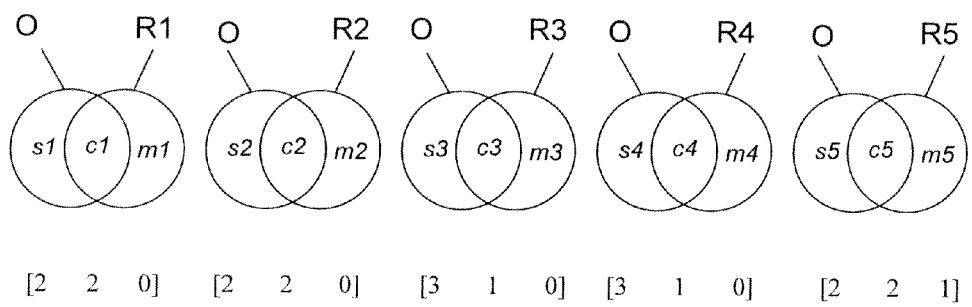
FIG. 5 illustrates possible relationships between an observation comprising the identities of multiple wireless transmitters and partially matching database-records.

An example of such a measure is described in WO2009/141660, in the context of WLAN AP MAC addresses. For completeness, this method will be summarised here, with reference to FIG. 5. FIG. 5 shows a set of five Venn diagrams. Each Venn diagram describes a comparison between an observation O and a record Rn stored in the database. In each case, there are a number of common MAC addresses cn, which are the addresses which occur in both the database record and the observation—in other words the intersection of the two sets. There are also a number of surplus MAC addresses, sn, observed but not present in the database; and a number of missing MAC addresses, mn, present in the database but missing from the observation.

For each record, a score can be calculated. A weighting can be applied as follows:

the number of MAC addresses in common weighs heavily in a positive way;

the number of surplus MAC addresses counts weakly negatively; and the number of missing MAC addresses counts weakly negatively.

This gives the set of data variables shown in FIG. 5, as s1 to s5, c1 to c5 and m1 to m5 (s=surplus, c=common, m=missing). The number in brackets underneath is the corresponding number of elements. The best matches in the above example would be the first and second (from left to right), because they have 2 MAC addresses in common ($c1=c2=2$), with 2 surplus and 0 missing counting against them ($c1=c2=2$; $s1=s2=2$ $m1=m2=0$). The fifth example is a close second, having the same number of common and surplus MAC addresses, but it has one missing MAC address counting weakly against it.

When estimating the position of an electronic device, a method or apparatus according to an embodiment of the invention can take into consideration information from multiple different databases. This information can be combined in a manner that depends both on the particular database from which the data originated and the extent to which the observations made by the electronic device match the contents of the database. This means that if some of the database records are reorganised, such that a record which was a member of one database is now assigned to a different database, a different estimate of position may be produced While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment wherein additional measurements are made as part of the observation by the electronic device whose position is to be estimated. These additional measurements may include signal strength measurements; measurements of signal-to-noise ratio; or error rates, among others. Such measurements could be applied to communications in either direction between the electronic device and the wireless transmitters. For example, the observation might include measurements of signal-strength profile for signals received at the device from each of the wireless transmitters; or it might include measurements of strength for signals received at each transmitter from the electronic device; or both. Of course, in the latter cases, some communication will typically be necessary between the transmitters which measure the signal strength and the device implementing the rest of the position estimation method.

Likewise, a record with which the observation is compared may comprise corresponding signal-strength measurements (in addition to the identities of a set of one or more transmitters and an associated position). This may enable more sophisticated ways of estimating the position of the electronic device. For example, if the positions of the transmitters themselves are known, then if the signal strength of a given transmitter is relatively high, the electronic device can be assumed to be relatively close to that transmitter. In another example, the quality characteristic of a match could comprise a measure of how similar the signal strength measurements (in addition to the identities of the transmitters) of the current observation are to a given record.

As will be apparent to those skilled in the art, embodiments can be implemented in a wide range of physical configurations. In some embodiments, an electronic device will sample the wireless environment to determine the identity of the visible wireless transmitters and will then transmit this observation to a remote server. The server will then implement the remainder of the position estimation method. All the databases may be stored at this remote server. Once the position has been determined the server may respond to the electronic device to provide the estimated position (for example, for personal navigation applications); or the server may simply append the latest position of the device to a log (for tracking applications). Such embodiments permit the use of very simple and low-power portable devices. Communication with the server may occur in real-time, via a wireless data communications link; alternatively, the observations may be stored on-board the electronic device for some period and later uploaded to the server. The latter implementation also facilitates off-line tracking applications, using a basic electronic device that simply records the wireless transmitters that it detects, over time. Once transferred to the server, the observations can be processed to provide a history of the device's movements.

Indeed, it is not even essential that the electronic device has the ability to determine the identities of the transmitters itself: the device could simply receive; digitise; and store a short segment containing any signals receivable in a particular frequency band of interest. An exemplary device adapted to do this might include a Radio-Frequency (RF) tuner; down-conversion stage; analogue-to-digital converter; and memory to store the digitised Intermediate Frequency (IF) or baseband signal samples. Such a snapshot of the wireless environment could be processed later, to extract the identities of the transmitters whose signals are present in the snapshot. Naturally, the necessary length of the snapshot would vary depending on the type of transmitters of interest (for example depending on how often they transmit an indication of identity).

As explained in the described embodiments, it is also possible to implement the invention such that more of the method is executed by the portable navigation device. In the limit, all data and processing may reside in the portable device.

A possible enhancement to the method is the use of a time-dependent database. The use of a time-dependent database for wireless beacon positioning has been described in WO2009/141642. According to that method, the time that each observation is made is noted. Then, when comparing the observation with the reference records of the wireless environment, records that are associated with approximately the same time period as the time of the observation can be used. This reflects the fact that the wireless environment changes over time. For the most accurate results when an observation is processed to estimate position, the method should preferably compare it with the historical records of the environment as it was at the time the observation was made.

The same insight can be applied to, and combined with, the presently described methods. A record may further comprise an indication of the time when it was generated. The method may then comprise estimating the position in dependence upon the times of generation of the first and second records (in addition to their indications of source and the quality characteristics of the matches). For example, the position associated with each match may be weighted or prioritised more highly, according to its temporal proximity to the observation being processed. For real-time position estimation, this will result in basing the estimate preferentially on more recent records. For off-line position estimation (for example, where an observation is stored and processed later), this will result in the estimate being based preferentially on historical records that were generated close to the time of the observation.

In an embodiment, this may be implemented by multiplying a joint table of priorities (such as that shown previously above) by a value which has a direct relationship with the temporal difference between the observation and the record. The larger the temporal difference, the greater the multiplying factor will be. Since the highest priority is assigned to the lowest-valued number in the table, larger temporal differences will reduce the priority of a match.

In another embodiment, a joint table of weights (such as that shown previously above) may be multiplied by a value having an inverse relationship with the temporal difference. Thus, the greater the temporal difference the more the weight will be reduced.

Note that the consideration of the temporal proximity between the observation and the records can be done in addition to the contextual determination of how to prioritise different sources of data, as described previously, above.

In the embodiments described above, the examples were given of a PND or a package tracking device, for a parcel. However, the invention can be usefully applied with a much wider variety of devices. For example, a camera could be equipped to take measurements of wireless signals, in order to determine the location at which a photograph is taken. Correspondingly, a shared database for camera users would represent the common locations for taking photographs. This emphasises the benefits of adapting the type of shared database to the usage pattern, or type, of the device.

In the embodiments contemplated above, an indication of the identity or type of a device may be a label, such as a code identifying a particular product or manufacturer. However, in other embodiments, the indication could equally comprise specific parameters of a device or software application. For example: a device might be identified by parameters such as antenna size or gain, or receiver sensitivity.

The source of a record can also be characterised in other ways. For example, a user or use of a device might be characterised by a maximum speed of movement. This might be appropriate to distinguish between positioning devices associated with particular activities, such as golf, walking, running, cycling or driving. Any of these parameters can form useful criteria for clustering groups of devices.

The indication of source may also include details of the configuration or the mode of operation of the hardware of software responsible for creating a record. In this way, the indication of source for a particular device may vary with usage. For example the indication of source may be changed when a particular software application is running, or when a portable device is used with a power supply connected, instead of being powered by its own internal battery.

Other detailed indications of source can be imagined—for example, when a device is connected to a specific power supply such as a car power adaptor (car charger). In this mode of operation the device is a member of a group of powered devices, and has location in common with other vehicular devices. The typical locations for such a group are along the roads and in car parks (when in the car). In contrast, when the same device is connected to a mains power supply, the more likely locations are indoors, such as at home or in the office. Meanwhile, when the device is using its internal battery supply the typical locations for the user and collected in the group are different—walking around town, inside shopping malls, coffee shops, theatres, airports and so on.

In embodiments described above, a set of records (such as a database) is used to estimate the position of an electronic device, exploiting knowledge of the sources of the records to improve the position estimation. These methods may also advantageously be used in conjunction with methods for intelligently populating a database with records. One such exemplary method of intelligent database-population will now be described—in particular, in the context of a system which combines wireless beacon-based positioning with GPS.

Previous methods combining GPS and beacon-based positioning have relied on the concept of a dedicated "war-drive" in which an individual travels around an area of interest, collecting observations of all the visible WiFi access points and correlating them with measured GPS position. The inventors have recognised that, while this approach works well for populating a large, shared database and for explicitly estimating AP locations, it is not appropriate for a single independent user. On the contrary, for a portable device which needs to dynamically switch between position estimation by GPS and WiFi (when GPS is unavailable), it is much better to target the gathering of WiFi AP data intelligently. That is, WiFi observations are only taken if they are likely to be of use later on. This saves power and memory consumption due to the elimination of redundant and unnecessary AP observations and also customizes the database to the usage patterns and activities of the given user. With regular periodic sampling regimes, the only way to reduce power consumption is to decrease the frequency of the samples; but this decreases the overall accuracy and robustness of the positioning system. In the presently described system, the quality of position estimates from adaptively triggered observations will therefore be higher that than from sparsely sampled regular observations.

The inventors have also recognised that here are a number of relevant cues readily available to a typical PND, which indicate when it might be useful to add an AP observation to the database.

Figure 6:
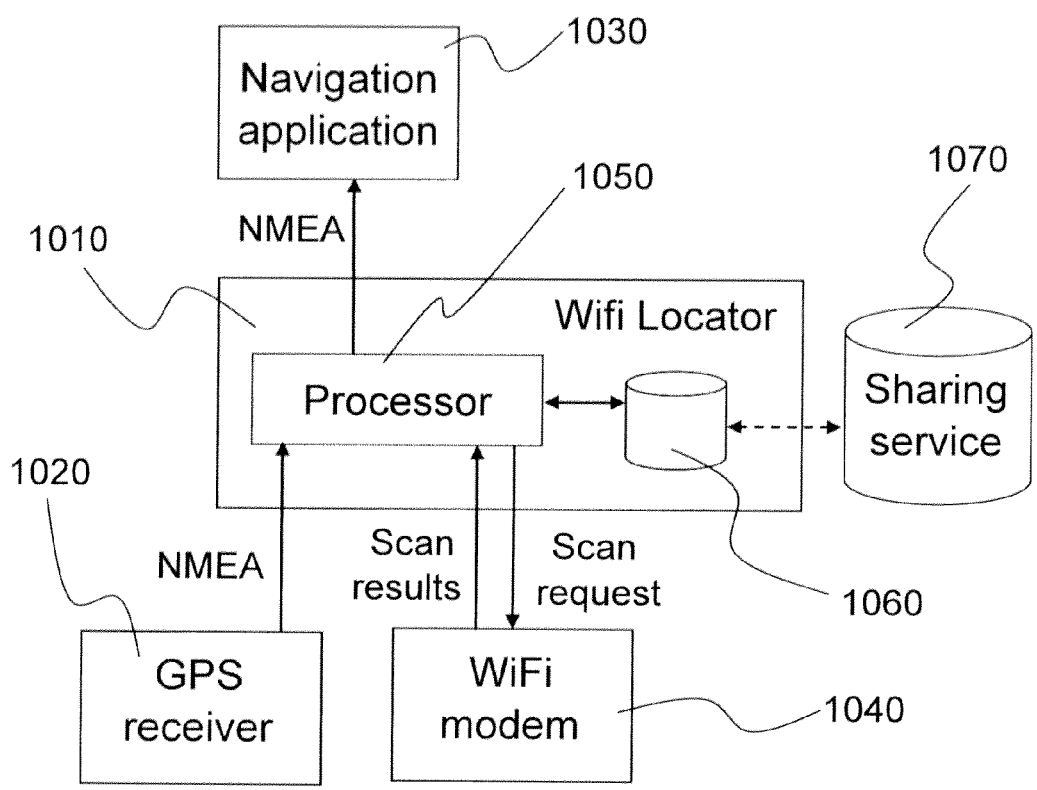
FIG. 6 is a block diagram of a device adapted for intelligent database population.

FIG. 6 shows a system for robust position estimation. For the sake of clarity of exposition, the system will be described with the assumption that it relates to real-time GPS positioning; however, this does not exclude the possibility of implementing the system as a capture and process system.

The system includes a WiFi locator device 1010, which is intended to augment an existing GPS receiver 1020 and navigation application 1030. That is, in a conventional configuration, GPS receiver 1020 would be connected directly to the navigation application 1030. In the example, the communication between these two is via a NMEA (National Marine Electronics Association—NMEA 0183) interface. The WiFi locator 1010 is designed to receive input from the GPS receiver 1020 and output enhanced position data to the navigation application 1010 via the existing NMEA interfaces of those respective devices.

A WiFi modem 1040 is also connected to the WiFi locator 1010. The modem 1040 can communicate with WiFi (WLAN) access points in the vicinity of the device. In particular, it can interrogate (either passively or actively) the APs to determine the identity (typically given by a MAC address) of each. Since each individual MAC address is unique, the set of APs visible at any given instant can be used to infer the location of the WiFi Locator device. The accuracy of this inference is fundamentally governed by the transmitter range of each AP as well as by the physical layout of the set of APs. However, the inference also depends on the availability of information cross-referencing or associating the AP identities with position. This information is collected by the device in a dynamic manner.

The WiFi locator 1010 includes a processor 1050 and a memory 1060. The processor receives data from both the WiFi modem 1040 and the GPS receiver 1020. In this example, which uses a real-time GPS implementation, the data received from the GPS receiver 1020 consists of position information, such as geographic coordinates. It may also include additional information, such as the status of the GPS receiver 1020 and the predicted error in the position estimates being provided. The position information provided by the GPS receiver comprises a primary, trusted position estimate. The GPS position will be used as a reference from which other estimates can be inferred (using WiFi positioning).

The processor receives observations of WiFi APs from the WiFi modem 1040. These consist of a list of MAC addresses of nearby wireless APs detected by the modem 1040. The modem 1040 may produce this list by an active or a passive scan. In an active scan, the APs are interrogated with a query by the modem 1040. In a passive scan, the modem simply records broadcast AP identity information. Scans are initiated (requested) explicitly by the processor 1050 in the WiFi Locator 10. By waiting until scans are explicitly triggered by the processor 1050, rather than executing continual regular scans, the WiFi modem 1040 saves power. The capacity of the memory 1060 is also used more efficiently, since the triggered scans are chosen intelligently to correspond to the situations in which they are most useful to an individual user. That is, the scans are requested by the processor 1050 in response to an indication that a WiFi position estimate is likely to be required subsequently. This indication can be derived from several sources, as will be described in greater detail below.

The processor 1050 stores the received position information and observations in the memory 1060. The memory may comprise a simple buffer which stores as little as just one previous observation and position. Alternatively, it may store a longer history of recorded positions and observations.

The processor 1050 uses the stored history of GPS position estimates and WiFi AP observations to enhance the location estimates provided to the navigation application 1030. By basing the estimates on the combined GPS and WiFi information, the WiFi locator 1010 can offer more robust and/or faster position information than is available by using either alone. For example, if the GPS receiver 1020 fails to provide a position estimate, but the WiFi modem nonetheless provides an observation, the processor can compare the current observation with a stored observation. If the comparison shows that a similar set of APs is visible, then the processor 1050 provides the stored position information (corresponding to the stored AP observation) to the navigation application 1030 as a location estimate.

Optionally, the content of the memory can be uploaded to a sharing service 1070. This allows other devices or users to utilise the set of positions and observations collected by the device. This will be particularly beneficial where multiple devices are owned by the same user—the information stored by each device will be equally relevant to that user and can be used by each device as if collected by that device. If the information is shared among users, the individual relevance of the data may be reduced; however, it may be better to have the shared data of another user rather than none at all—for example when visiting a new location for the first time, before personally collected data are available in the database. Another possibility for users who own multiple location-aware devices will be to link all the devices to a single WiFi locator. That is, multiple navigation applications 1030 can be enabled by a common WiFi locator 1010.

Figure 7:
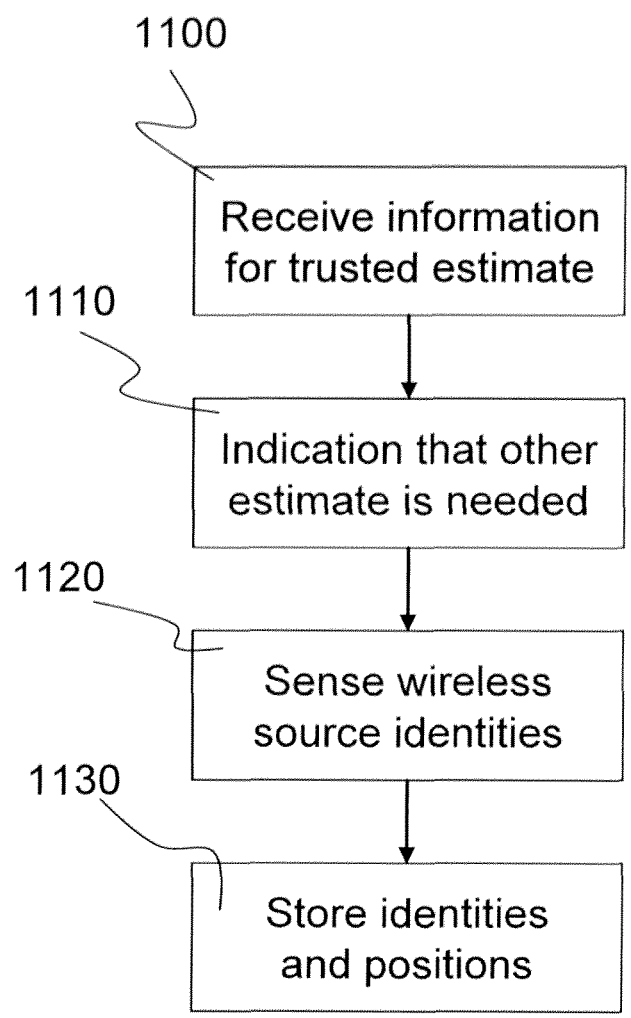
FIG. 7 is a flowchart showing a method of collecting information for intelligent database population.

FIG. 7 shows a flowchart of a first method. As before, this will be described in terms of a real-time GPS implementation. At step 1100, trusted (that is, GPS) signal data is obtained. The signal data comprises signals received from GPS satellites and is sufficient to enable a position to be calculated. The satellite signal data is received at a location A.

At step 1110, an indication is received that a secondary position estimate is likely to be required in the vicinity of location A. This requirement could arise for various reasons: for example, because GPS signals are expected not to be available and/or because this location is of particular significance to the user.

The indication can likewise be inferred from a number of sources. One useful indicator of the value of observations is the quality or possibility of the satellite position measurement itself. Thus, in one example, the indication might be a direct measurement of fading GPS reception, indicating that it will soon become impossible to compute a position fix. For example, when a position measurement via a GPS fix is no longer possible, the user is assumed to have moved from a good signal environment to a poor signal environment (for example walking through a doorway indoors). A sample observation of the sensed AP identities will give information about the environment in the vicinity of the doorway. Likewise, observations may be useful when the quality of the GPS fix is poor. In this case the user is in a marginal condition and it is likely that the environment will worsen—all gathered information could therefore be helpful at this stage. On the other hand, observations can also be triggered when a GPS fix becomes possible after a period of unavailability. This could be a useful boundary case to store, in case the user reverses their path, or indeed does the journey again another time. Previous knowledge about the environment in that event would assist in the prediction of the likely fix measurement.

In another case, the indication might be inferred from the activation or deactivation of the PND itself. A stage in the power down procedure of the PND (or its location function) could sample the signal environment, in order to recognise the environment and therefore likely location upon subsequent reactivation. For the same reasons, a sample can be triggered when switching on the device or location function.

Detected movement patterns of the PND can also provide a valuable source of information. Movement can be detected as a result of measurements of position fix by GPS or by other means (for example, by an accelerometer). In one exemplary approach, an observation may be sampled if the device is believed to have stopped moving. This is to gather a spot sample of the environment, in anticipation of possible movement into a difficult (for example, indoor) environment nearby. While the device remains stationary, further samples may be only taken at longer intervals (rather than continuously, or frequently), in case the environment changes. Sample observations may also be taken if the device is moving slowly, for example at walking speed. In this case, again, it is reasonable to expect that the user is likely to move into a difficult (indoor) environment, or is manoeuvring into a car park or garage. The frequency of samples may be reduced if travelling at high speed; under these conditions GPS visibility is likely to be good, and further information about the environment is not necessary. Starting (accelerating) from a stationary position is a useful indicator for the inverse reason: the user may just have emerged from an environment with little or no GPS reception. The common factor to each of these indicators is that they flag "boundary" cases—situations in which GPS reception may become unreliable, either shortly afterward or on a future journey.

Other indicators will imply that the current location is one of particular significance to the user. Certain application-activities will be location-dependent and may also indicate that an event of interest has occurred. Taking a photograph is a good example of this and would indicate that the user is interested in the immediate surroundings. Equally, a specific user request can be the trigger. The user could request an observation manually to mark a way-point on a trip, a favourite restaurant or some other landmark. Such a manual sample allows the environment to be associated with arbitrary user events of interest.

At step 1120, in response to the indication, an observation of nearby WiFi beacons (APs) is obtained. It is not essential that this observation is carried out at the precise time or location of the reception of the satellite signal data; however, the reception and observation must be close enough together that there is a reasonably high confidence that the observed WiFi identities are the same as those that are observable from the actual location of reception of the satellite signals (location A). In practice, this will mean that—if the observation of WiFi beacons and reception of satellite signals is not synchronised—the latter occurs sufficiently frequently that it is still possible to establish a meaningful correspondence. This may depend on the expected dynamics of the user device. If the application is vehicle positioning, reception of GPS signals may need to be relatively frequent, compared to a pedestrian application, in order to work at the higher speeds involved. Of course, even with careful design, the nature of the method is such that there will be occasions when a GPS fix is impossible at the location where the indication is received. Indeed, this is very likely if there has been a delay between receipt 1100 of the GPS signals and receipt 1110 of the trigger indication. Nonetheless, it will be useful to record an observation and associate it with the (temporally) closest GPS fix, on the basis that some reference information may prove better than none at all.

The result of the observation is a set of AP identities. At step 1130, the set of identities is stored in the memory 1060, associated with the position of the corresponding GPS fix (location A). The accumulated data in the memory comprises a database, which can be used to support subsequent position estimation based on wireless AP visibility. That is, when the GPS signal is not available, the PND can once again sense the wireless environment and this time compare the observed APs with the entries in the accumulated database. Similarity between the new observation and one stored in the database (in terms of commonality between the sets of visible APs) implies that the user is at or near the previously visited location.

Note that in the capture and process case, the explicit position fix may not be available at the time the observation is entered (stored) in the database. In this case, the set of AP identities may be associated with the position by means of a label (such as: "unknown1"). The IF signal data samples can then be stored associated with the same label, such that when they are later processed to extract explicit geographic coordinates, those coordinates can be associated with the corresponding stored observation.

Figure 8:
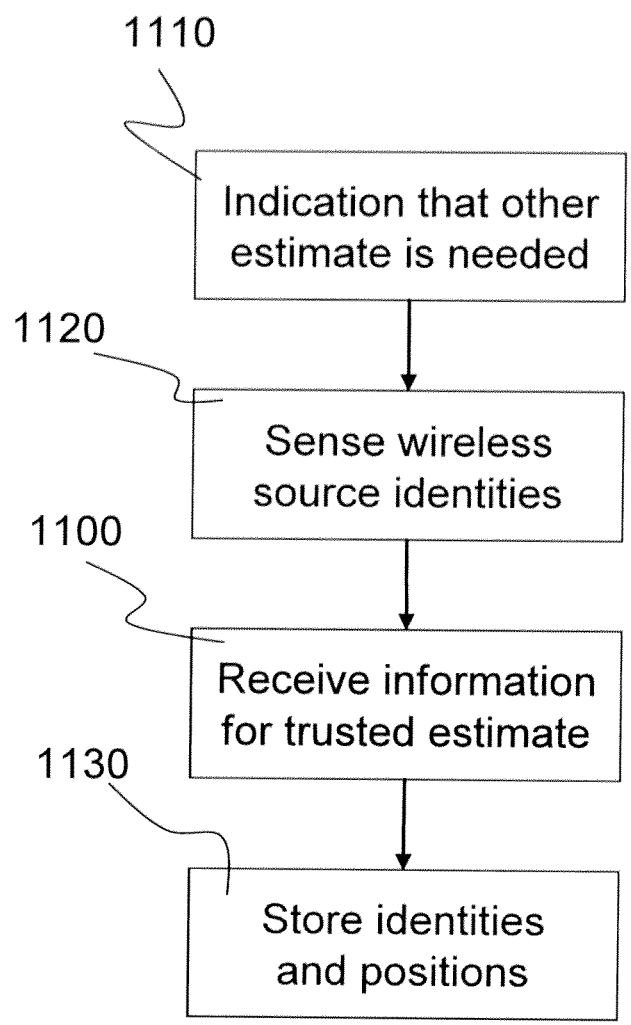
FIG. 8 is a flowchart showing another method of collecting information for intelligent database population.

In a second method, the steps of the method described above are re-ordered. This is illustrated in FIG. 8 and represents the case where an observation is associated with a trusted position estimate acquired after the observation, rather than before. Thus, in FIG. 8, the first step 1110 is the receipt of the indication to sense the wireless environment and store an observation in the database. At step 1120 the sensing is executed, in response to the indication. Afterward, at step 1100, the associated first information for the trusted (reference) estimate of position is obtained. As in the first exemplary embodiment, above, the final step 1130 consists of storing the observation result associated with the trusted position information. This sequence of steps is appropriate to the circumstances at the start of a journey, for example, before a first GPS fix has been achieved.

As will be readily apparent to the skilled person, other variations on the ordering of steps in the method are possible. One constraint in this regard is that the step 1120 of sensing the wireless AP identities is carried out in response to (and therefore after) the receipt of the indication to do so. Another obvious practical constraint is that the storage of the observation (identities) cannot take place until after they have been sensed.

As noted above. GPS positioning is just one example of the kind of trusted estimate from which the AP position database may be constructed. However, any available source of position information can be a valid trusted estimate. Indeed, estimated positions based solely on WiFi AP sightings (that is, position estimates exploiting previously stored observations) may be used, if no more reliable information is available. This will, in effect, result in a "chain" of estimates, with "trusted" reference positions calculated from former estimates—which will invariably lead to reduced accuracy, the longer the chain. However, it may allow observation data to be created and associated with positions which are otherwise impossible to determine. This increases the coverage of the database. In many cases, this will be acceptable and certainly preferable to a complete inability to estimate a location. For example, a user may arrive after a car journey at his destination and go inside a building. The PND senses wireless access point X just as it loses a GPS fix. Later, the user moves deeper into the building, where the PND observes AP-Y in addition to AP-X. The device is able to estimate its location as being that where AP-X was first seen and uses the last successful GPS fix (from the car-park) to derive this estimate. The observation of X+Y is stored associated with this estimate. Later still, sight of AP-X is lost but AP-Y is remains visible. Although there was never a true position fix (that is, GPS position) associated with AP-Y, the device can use the stored previous location estimate (derived when AP-Y and AP-X were both visible) as the basis for a secondary estimate. The accuracy of the estimate may be less than for the primary estimate (that is, the estimate directly associated with the GPS fix in the car park) but still places the user at the same street address. Thus, overall spatial coverage is increased.

Note that this scenario also highlights some of the advantages of using individual, personalised collection of observations (records) to infer position, in preference to shared, collective observations. Various other users may have detected the same WiFi Access Point, X, from different positions (for example, while driving along the road; walking on the pavement near the windows of the building; at a rear service-entrance; or from neighbouring buildings). None of these positions is as relevant to the current user as his own previous observation, at the position where he entered the building. It is likely that the position estimate based on his own historical observation will be more accurate, compared with a position estimate based on the observations of one of the other users. For this reason, it is beneficial to use the user's own previous observation, when available, in the absence of any indication to the contrary.

One advantageous alternative source of trusted position information is the use of manually input location as the trusted position data. Such manual input can take a variety of forms. For example a user could enter an address or postcode; this can then be used, together with a geographic information systems (G(S) database, to derive position coordinates. The user could also indicate their position graphically on a map— in its simplest form this might involve confirming to the PND that the position has not changed from the last available position fix. Although requiring user input is usually avoided, to minimise the burden on the user, in many situations where GPS is unavailable, it will cause little inconvenience to enter a postcode, or click on a map—for example, when parked in a car-park or pausing inside a building before leaving on a journey. When manual input of location occurs, this can itself be taken as an indication to sense wireless AP information, since the location is very likely to be outside GPS coverage and is also clearly of interest to the user. Thus, an observation should be stored associated with the manually input location at this time.

Optionally, the triggering of an observation (and its entry into the database of samples) may be followed by suppression of further observations. This additional step recognises that redundancy may be reintroduced if repeated samples of the environment are sensed in response to the same stimulus (that is, the trigger-indication). For example, once one observation has been made, be of limited value to take another WiFi sighting if he device is known to be stationary.

The methods described above can be used to advantage in the following example scenario:

A user switches on his personal navigation device (PND) at his home. The system samples the environment (in response to activation), making observations of nearby wireless APs, and starts up the GPS receiver. The user drives to a new destination (the system navigating on GPS). He arrives successfully and parks. The system samples the environment again (in response to having stopped), before the user turns the PND off. A further sample might be triggered by the power-off command, or this extra sample may be suppressed since a separate observation has already been taken very recently.

At the end of the appointment it is raining. The user turns on his PND indoors to find a route home. No GPS signal is available. The PND recognises the environment from a further AP observation—it is still the same as when it was last turned off—and so places him where he parked. He plans his journey to stop at a café down the road, goes to the car, and sets off. The GPS acquires the signals, and helps him complete his journey to the café. He goes inside, where the system picks up the new WiFi signals of another AP (the observation having been triggered as the GPS signal faded). His position is still shown on the PND—although the GPS signal has been lost, the system is now using the WiFi signals just found. Over a coffee, he works out his route home, and then drives home, turning off the PND once he is safely on the motorway.

The next day he again gets in the car at home in his garage, ready to go to his next appointment. He switches on his PND. The system samples the environment to determine position since no GPS fix is yet available, recognises the home location (and not where he previously finished, on the motorway), and provides the coordinates to the navigation system, immediately ready to plan the day's route.

This example scenario demonstrates the advantages of the current methods. The user has collected a small but highly relevant quantity of data relating AP observations with known positions. This can then be used to augment the GPS positioning system when conditions make it necessary. Since the stored information is related to the activity of the user, the information quality is higher than for a generically-surveyed database. Furthermore, all information is up-to-date (that is, current) and usable immediately. Observations are collected when they are most valuable or most likely to be needed. Moreover, such intelligent sampling can also eliminate or at least reduce the number of unnecessary observations—reducing power consumption and helping to prolong battery life.

These methods are characterised by their lack of reliance on a previously populated or shared database. However, it is nonetheless possible to upload stored data to such a shared database for the benefit of other users. Data may also be downloaded from such a sharing service to augment the observations made by an individual PND itself. It may however be advantageous to use the individually collected data in preference to generic shared data, since the observations collected by the user's own device are likely to be more relevant to their usual navigation needs and habitual movements. In essence, the self-obtained data is personalised to a given user. When data are uploaded to a sharing service, the data may be labelled as corresponding to that user, both to protect privacy and to allow that data to later be prioritised (when re-used by the submitting user) over other data (submitted by strangers).

The previous example above illustrates the benefits of such prioritisation. When the user switches on his navigation device in the morning (in his garage, at home), the device recognises the "home" location from the wireless environment, which is associated with the last GPS fix when the user arrived home on the previous evening. His neighbour may be using her own personal navigation device in a similar way. Her device may detect the same set of wireless base stations as the first user; however, her device will have associated these same wireless observations with a different position— her own driveway—because that is where she has historically detected them. Note that small differences in the deduced position can be significant. For example, if the device was to confuse a house on one side of the street with a house on the opposite side, the first navigation instruction ("turn left" or "turn right") would be incorrect. Similar problems could arise if the users live close to the junction of two roads.

The benefits of selective or preferential treatment of observation-data are not limited to the distinction between a single user and collective group of users. Different groups (of users or devices) can also exploit the same principle, provided there is some degree of homogeneity in the characteristics of the group.

For example, different types of devices will have different locations from where they typically detect a particular wireless beacon or set of beacons. For example—for the same or similar observations—personal devices (such as mobile phones) may associate the wireless observation with GPS coordinates of the main entrance of a building. Meanwhile, in-car devices such as car navigation accessories would associated the observation with the GPS coordinates of the car park; and packages and parcels would likely be associated with the "goods inwards" reception area. Take the example of an airport—the hire cars of a particular hire-company will all tend to be in one section of the Car-Return multi-storey car park, whereas the company's staff will tend to be in the office area, and the general community of travellers in the departure lounge.

The preceding examples have all focused on the real-time GPS applications of the invention. However, as already noted, the ideas are equally relevant in a capture-and-process scenario. For completeness, the alterations to the device of FIG. 6 to equip it for the capture and process scenario will now be described. In the capture and process regime, the WiFi locator 1010 of FIG.6 becomes an intelligent logger. This device is operable to receive and store signal samples of the GPS satellite broadcasts. It is also samples and stores observations of WiFi nodes nearby, in response to triggered scan requests. The logged data can then be provided to another device (including, but not limited to, a personal computer) for processing. The GPS receiver 1020 comprises a GPS Radio Frequency (RF) front-end. This performs the functions of filtering, down-mixing to intermediate frequency (IF) and sampling (analogue to digital conversion) necessary to capture a digital representation of the raw satellite signals. This simplified GPS receiver will not necessarily communicate using the NMEA interface. Indeed, it is more likely to be integrated in the WiFi locator device 1010. The WiFi modem 1040 senses/interrogates the nearby access points to determine at least their identities, as before. The observations and IF data samples are stored in a memory 1060 for later processing. The IF data and observations may be directly associated with one another, or may simply be stored with timestamps to enable correspondence to be determined later. At the appropriate time, the stored information is transmitted to the device responsible for completing the processing (in the example of FIG. 6, the navigation application 1030). As an alternative, the offline processing may be carried out in the logger/locator 1010, but at a convenient time—for example, processing only when logging has stopped, to normalise the power consumption of the device over time. In any case, the processing carried out is the same as that described above in the context of the real-time embodiments. One further advantage is that a capture-and-process system is not limited to making causal inferences. That is, the observation and signal data or position information which forms the basis for a location estimate can come from any point in time—both prior and subsequent to the event/observation of interest.

Many variations are possible in particular implementations of the methods described above. For example, the observations may involve more detailed sampling of the environment than simply recording the identities of local wireless APs. Other parameters, such as signal strength, direction of arrival and time delay could all be measured. Information relating to movement can also be useful—for example, velocity and time or distance and direction information can be combined in dead-reckoning navigation. This allows a (successful) position estimate to be projected into the future (or past). In the current context, this could be used to more precisely estimate the position at which a WiFi observation has been made (in the case where these are not synchronised with GPS signal data collection)—signal data captured at a point nearest in time to the that of the triggered observation can provide a starting point which can be projected forwards or backwards, as necessary, using movement data to accurately estimate the position at the time of the observation.

Naturally, the scope of the invention is not limited exclusively to wireless LAN (WiFi) APs. Other terrestrial radio transmitters could fulfil the same function. For example, analogue and digital broadcast radio and television transmissions can be observed, as can signals from cellular (mobile) telephony base stations. In each case, the identity of the transmitters can be used to infer connections between observations at different times and places. It is not an absolute requirement that the beacons be fixed terrestrial transmitters (although processing and inference is likely to be more straightforward if they are). For example, Bluetooth radio devices could be the observed wireless sources. Although many Bluetooth devices are portable, inferences will still be possible to a more limited extent. For example, one set of Bluetooth mobile devices may consistently be observed in the home environment and a second separate set may consistently be observed in the work environment. With longer historical storage of measurements and more advanced algorithms it will be possible to deduce with increasing certainty which sources are the most reliable or specific indicators.

The techniques described above rely on methods of computing similarity or "overlap" between different observations of wireless sources to establish associations and deduce the reference positions for estimating locations. Among these methods, more advanced approaches to estimating reference positions, in which multiple observations of wireless sources are combined to arrive at a position estimate, will tend to be more accurate. Some indicative examples are as follows:

(i) Find an average position from all stored positions where all the currently observed signals have been recorded before. That is, to estimate the current location, retrieve from memory multiple observations identical to the current observation; then, combine the position information associated with those multiple observations by a simple spatial average, to estimate current location.

(ii) Choose the strongest sensed signal (of a wireless source) currently observed which is also stored in the local database (that is, in memory); then, estimate the location as wherever the database reports the strongest instance of this sensed signal to have been observed. This predicts based on a single pair of observation and position estimate; however, this pair is chosen intelligently, based on relative signal strengths. There are two underlying assumptions—firstly, that the strongest observed signal corresponds to the nearest source and secondly, that the strongest recorded instance of that signal corresponds most accurately to the position of the source.

(iii) The local database (memory) can be searched to find the location corresponding to the most recent sample where an identical or similar environment (that is, set of sensed sources) has been observed. This approach works on the assumption that more recent information is more relevant than older observations.

The "similarity" of two sets of sensed sources could involve analysis of the size (strictly, the cardinality) of the intersection of the sets as compared to that of the set difference or symmetric difference. That is, a match is sought which has a large number of sources in common with the current observation and few extra or missing sources. There are a wide variety of possible ways to define the similarity, using set theory, which will be readily apparent to the skilled person.

Optionally, moving signal sources (such as WiFi nodes on trains) may be detected and taken into account. For example, sensed signals likely to be associated with a moving feature may be identified by detecting their appearance in many different "locations"; by detecting a high level of Doppler effect on some sensed signals; or by having the base-station announce that it is installed on a moving platform. Such signals may either be ignored for finding a stationary location or used to consider the hypothesis that the user is moving together with the signal source.

Note that, although the description above makes reference to GPS satellite positioning, the techniques described are equally applicable to other Global Navigation Satellite Systems (GNSS) such as Galileo and GLONASS.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of estimating the position of an electronic device, comprising:
   receiving an observation including the identity of at least one wireless transmitter detected by the device at the position to be estimated;
   comparing the observation with a plurality of records, each record comprising the identity of one or more wireless transmitters and a corresponding position, the position being based on a location or set of locations at which the one or more transmitters were detected, each record originating from a source other than the wireless transmitter which may be determined from the record;
detecting a first match between the observation and a first record, the first record comprising a corresponding first position;
determining a first indication of the source of the first record;
detecting a second match between the observation and a second record, the second record comprising a corresponding second position;
determining a second indication of the source of the second record, wherein the second indication is different from the first indication; and
estimating the position of the electronic device based on at least one of the first and second positions, depending upon the first indication and the second indication:
wherein the first and second indications suggest that the first record originates from a source that is more closely related to the electronic device that the source of the second record, wherein:
if the second match is more specific than the first match, then the estimation of the position of the electronic device is based preferentially on the second position;
otherwise the estimation is based preferentially on the first position.

2. The method of claim 1, wherein at least one of the first and second indications of source indicates at least one of:
the identity of one or more devices which contributed to the record by having detected the one or more transmitters at the location or set of locations;
the identity of one or more software programs which caused said one or more devices to contribute the record and
a group to which said one or more devices or software programs belong,
wherein said group is preferably associated with at least one of:
a type of said one or more devices or software programs; and
a user or group of users with which said one or more devices or software programs are associated.

3. The method of claim 2, wherein:
the first indication indicates that the source of the first record is the electronic device itself; and preferably
the second indication indicates that the source of the second record is one or more devices among a limited group of devices.

4. The method of claim 1, wherein at least one of the first and second indications comprises a label in the respective matched record.

5. The method of claim 1, wherein if the first and second indications suggest that the first record originates from a source that is more closely related to the electronic device than the source of the second record, then the estimation is based preferentially on the first position.

6. The method of claim 1, wherein the step of estimating the position of the electronic device comprises a linear or non-linear combination of the first and second positions.

7. The method of claim 6, wherein:
the position corresponding to each match is assigned a priority, wherein each priority is based on the indication of the source of the corresponding record; and
the step of estimating the position of the electronic device comprises selecting the position having the highest priority.

8. The method of claim 6, wherein:
the position corresponding to each match is assigned a weight, wherein each weight is based on the indication of the source of the corresponding record; and
the step of estimating the position of the electronic device comprises calculating a weighted average of the positions according to the assigned weights.

9. The method of claim 1, further comprising determining a quality characteristic of the first match and a quality characteristic of the second match,
wherein the step of estimating the position of the electronic device depends upon the first indication, the quality characteristic of the first match, the second indication and the quality characteristic of the second match.

10. The method of claim 9, wherein the quality characteristic of the first match and second match comprises a measure of how specific each match is, preferably comprising at least one of:
a degree of similarity between the set of at least one identity comprised in the observation and the set of one or more identities comprised in the matched record; and
a degree of geographic precision implied by the match.

11. The method of claim 10, wherein the identity of each transmitter has a hierarchical structure, whereby successive levels of the hierarchy correspond to successively more limited geographic areas; and
wherein the measure of specificity of the match is based on the degree of similarity between the hierarchical identity of the at least one transmitter in the observation and hierarchical identity of the one or more transmitters in the matched record.

12. The method of claim 9, wherein:
the position corresponding to each match is assigned a priority,
wherein each priority is based jointly on:
the quality characteristic of the match; and
the indication of the source of the corresponding record, and
the step of estimating the position of the electronic device comprises selecting the position having the highest priority.

13. The method of claim 9, wherein:
the position corresponding to each match is assigned a weight, wherein each weight is based jointly on:
the quality characteristic of the match; and
the indication of the source of the corresponding record, and
the step of estimating the position of the electronic device comprises calculating a weighted average of the positions according to the assigned weights.

14. The method of claim 1, further comprising submitting data to the plurality of records, the data comprising:
the observation;
an estimate of the position of the electronic device; and preferably
a label identifying at least one of: the electronic device; its type; or a group of devices to which it belongs.

15. A non-transitory computer readable medium, the computer readable medium including code instructing a processor to perform steps of:
receiving an observation including the identity of at least one wireless transmitter detected by a device at the position to be estimated;
comparing the observation with a plurality of records, each record comprising the identity of one or more wireless transmitters and a corresponding position, the position being based on a location or set of locations at which the one or more transmitters were detected, each record originating from a source other than the wireless transmitter which may be determined from the record;

detecting a first match between the observation and a first record, the first record comprising a corresponding first position;

determining a first indication of the source of the first record;

detecting a second match between the observation and a second record, the second record comprising a corresponding second position;

determining a second indication of the source of the second record, wherein the second indication is different from the first indication; and estimating the position of the electronic device based on at least one of the first and second positions, depending upon the first indication and the second indication wherein the first and second indications suggest that the first record originates from a source that is more closely related to the electronic device that the source of the second record, wherein:

if the second match is more specific than the first match, then the estimation of the position of the electronic device is based preferentially on the second position;

otherwise the estimation is based preferentially on the first position.

16. A portable device, comprising:

a wireless receiver, adapted to observe the identity of at least one wireless transmitter detectable by the device at a position to be estimated;

a query processor, operable to issue the observed identity as a query to be compared with a plurality of records in a database, each record comprising the identity of one or more wireless transmitters and a corresponding position, the position being based on a location or set of locations at which the one or more transmitters were detected, each record in the database originating from a source other than the wireless transmitter which may be determined from the record in the database, the query processor being operable to receive, in response to the query, the result of a first match between the observation and a first one of the records, the result comprising:

a first indication of the source of the first record;

a first position estimate, being the position corresponding to the first record, the query processor also being operable to receive, in response to the query, the result of a second match between the observation and a second one of the records, the result comprising:

a second indication of the source of the second record, wherein the second indication is different from the first indication;

a second position estimate, being the position corresponding to the second record; and a position estimator, adapted to estimate the position of the portable device based on at least one of the first position estimate and the second position estimate, depending upon the first indication and the second indication wherein the first and second indications suggest that the first record originates from a source that is more closely related to the portable device than the source of the second record, wherein:

if the second match is more specific than the first match, then the estimation of the position of the portable device is based preferentially on the second position;

otherwise the estimation is based on the first position.

17. The portable device of claim 16, further comprising an onboard memory, for storing the whole or part of the plurality of records.

* * * * *

UNITED STATES PATENT AND TRADEMARK OFFICE
CERTIFICATE OF CORRECTION

PATENT NO. : 8,804,551 B2  
APPLICATION NO. : 13/020736  
DATED : August 12, 2014  
INVENTOR(S) : Marshall et al.

Page 1 of 1

It is certified that error appears in the above-identified patent and that said Letters Patent is hereby corrected as shown below:

Title Page, Inventors, Item [75], line 2, please change "Andrew Thomas Yale," to -- Andrew Thomas Yule, --
Title Page, Abstract, Item [57], line 4, please change "to be estimate," to -- to be estimated, --
Title Page, Abstract, Item [57], line 5, please change "set of record," to -- set of records, --

In the Claims
Column 33, line 20, please change "device that the" to -- device than the --

Signed and Sealed this
Sixteenth Day of December, 2014

Michelle K. Lee
*Deputy Director of the United States Patent and Trademark Office*